US011061040B2

(12) United States Patent
Yamamoto et al.

(10) Patent No.: US 11,061,040 B2
(45) Date of Patent: Jul. 13, 2021

(54) PRETREATMENT APPARATUS AND PRETREATMENT METHOD

(71) Applicant: SYSMEX CORPORATION, Kobe (JP)

(72) Inventors: Takeshi Yamamoto, Kobe (JP); Hiroyasu Sumida, Kobe (JP); Yoshihiko Kitawaki, Kobe (JP); Seiichiro Tabata, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 404 days.

(21) Appl. No.: 15/842,470

(22) Filed: Dec. 14, 2017

(65) Prior Publication Data

US 2018/0172715 A1 Jun. 21, 2018

(30) Foreign Application Priority Data

Dec. 15, 2016 (JP) .............................. JP2016-243860

(51) Int. Cl.
*G01N 35/00* (2006.01)
*G01N 1/40* (2006.01)
(Continued)

(52) U.S. Cl.
CPC ..... *G01N 35/00732* (2013.01); *B04B 5/0421* (2013.01); *G01N 1/31* (2013.01);
(Continued)

(58) Field of Classification Search
CPC .. G01N 35/00732; G01N 1/4077; G01N 1/44; G01N 1/31; G01N 35/025;
(Continued)

(56) References Cited

U.S. PATENT DOCUMENTS 4,632,808 A * 12/1986 Yamamoto ......... G01N 35/0099
356/427
4,708,886 A 11/1987 Nelson
(Continued)

FOREIGN PATENT DOCUMENTS

EP 0193016 9/1986
EP 0195893 10/1986
(Continued)

OTHER PUBLICATIONS

S. Fukiya et al., "Fish-Flow Cytometry as a New Method for Analysis of Intestinal Microbiota", Biochemistry, May 2008, vol. 80, No. 5, pp. 421-425.
(Continued)

*Primary Examiner* — Samuel P Siefke
*Assistant Examiner* — Quocan B Vo
(74) *Attorney, Agent, or Firm* — Brinks Gilson & Lione

(57) ABSTRACT

A pretreatment apparatus (100) for performing pretreatment of a sample is provided with a holder (610) for holding a container (10) containing a sample, a centrifugal separation device (600) for rotating the container (10) held by the holder (610) to perform a centrifugal separation, a temperature adjustment device (420) for adjusting the temperature of the sample in the container (10) in the holder (610), an input device (320) for receiving from a user a designated temperature that is adjusted by the temperature adjustment device (420), a controller (300) for controlling the temperature adjustment device (420) in accordance with the designated temperature received via the input device (320).

18 Claims, 32 Drawing Sheets

(51) Int. Cl.
  *G01N 1/44* (2006.01)
  *B04B 5/04* (2006.01)
  *G01N 1/31* (2006.01)
  *G01N 35/02* (2006.01)
  *G01N 35/04* (2006.01)

(52) U.S. Cl.
  CPC ............ *G01N 1/4077* (2013.01); *G01N 1/44* (2013.01); *G01N 35/025* (2013.01); *G01N 2001/4083* (2013.01); *G01N 2035/00346* (2013.01); *G01N 2035/00356* (2013.01); *G01N 2035/00435* (2013.01); *G01N 2035/00495* (2013.01); *G01N 2035/00504* (2013.01); *G01N 2035/00524* (2013.01); *G01N 2035/00851* (2013.01); *G01N 2035/0441* (2013.01); *G01N 2035/0444* (2013.01); *G01N 2035/0449* (2013.01)

(58) Field of Classification Search
  CPC .......... G01N 2035/00435; G01N 2035/00495; G01N 2001/4083; G01N 2035/00356; G01N 2035/00346; G01N 2035/00504; G01N 2035/00524; G01N 2035/00851; G01N 2035/0441; G01N 2035/0444; G01N 2035/0449; G01N 35/00; G01N 35/04; G01N 2035/0496; B04B 5/0421
  See application file for complete search history.

(56) References Cited

U.S. PATENT DOCUMENTS

| | | | | |
|---|---|---|---|---|
| 5,167,926 A | * | 12/1992 | Kimura | G01N 1/28 422/504 |
| 7,999,937 B1 | * | 8/2011 | Srivastava | B01L 3/502746 356/338 |
| 2002/0137218 A1 | * | 9/2002 | Mian | B29C 59/14 436/45 |
| 2004/0197233 A1 | * | 10/2004 | Nagaoka | B01F 15/0233 422/81 |
| 2010/0105074 A1 | * | 4/2010 | Covey | G01N 35/00722 435/7.1 |
| 2011/0076755 A1 | * | 3/2011 | Ebi | G01N 1/38 435/287.3 |
| 2011/0176976 A1 | * | 7/2011 | Ebi | G01N 35/04 422/547 |
| 2013/0078624 A1 | * | 3/2013 | Holmes | C12Q 1/68 435/6.11 |
| 2013/0224851 A1 | | 8/2013 | Ljungmann et al. | |
| 2014/0295450 A1 | * | 10/2014 | Morita | C12Q 1/6886 435/6.14 |
| 2014/0371047 A1 | | 12/2014 | Lerche et al. | |
| 2015/0127270 A1 | | 5/2015 | Goemann-Thoss et al. | |

FOREIGN PATENT DOCUMENTS

| | | |
|---|---|---|
| JP | S61-139756 A | 6/1986 |
| JP | S61-212766 A | 9/1986 |
| JP | S61-230059 A | 10/1986 |
| JP | H03-175362 A | 7/1991 |
| JP | H6-281655 A | 10/1994 |
| JP | H6-308133 A | 11/1994 |
| JP | H8-507147 A | 7/1996 |
| JP | 2003-531380 A | 10/2003 |
| JP | 2009-510399 A | 3/2009 |
| JP | 2009-544955 A | 12/2009 |
| JP | 2010-85249 A | 4/2010 |
| JP | 2012-88055 A | 5/2012 |
| JP | 2013-110999 A | 6/2013 |
| JP | 2014-530358 A | 11/2014 |
| JP | 2015-508177 A | 3/2015 |
| WO | 01/79856 A2 | 10/2001 |
| WO | 2007/039524 A2 | 4/2007 |
| WO | 2008/012104 A2 | 1/2008 |
| WO | 2013/052318 A1 | 4/2013 |
| WO | WO 2013/125959 | 8/2013 |

OTHER PUBLICATIONS

K. L. Robertson et al., "Locked Nucleic Acid Flow Cytometry-fluorescence in situ Hybridization (LNA flow-FISH): a Method for Bacterial Small RNA Detection", Journal of Visualized Experiments, Jan. 2012, 59, e3655, pp. 1-7.
The Japanese Office Action dated Dec. 1, 2020 in a counterpart Japanese patent application No. 2016-243860.
The Communication pursuant to Article 94(3) EPC dated May 6, 2021 in a counterpart European patent application No. 17206975.9.

* cited by examiner

| Cooled reagent storage | Reagent name | Storage temperature | Heated reagent storage | Reagent name | Storage temperature |
|---|---|---|---|---|---|
| A | None | — | H | 1st hemolytic agent | Room temperature |
| B (B1–B5) | Antibody reagent | 4°C | I | None | — |
| C | None | — | J | 2nd hemolytic agent | Room temperature |
| D | None | — | K | None | — |
| E | PBS | 4°C | L | None | — |
| F | None | — | M | None | — |
| G | None | — | N | None | — |

FIG. 8

| Cooled reagent storage | Reagent name | Storage temperature | Heated reagent storage | Reagent name | Storage temperature |
|---|---|---|---|---|---|
| A | None | — | H | None | — |
| B (B1–B5) | None | — | I | None | — |
| C | None | — | J | Reaction Buffer | Room temperature |
| D | None | — | K | 2 × SSC | Room temperature |
| E | PBS | 4°C | L | None | — |
| F | MeOH/CH3COOH/PBS | 4°C | M | None | — |
| G | None | — | N | None | — |

FIG. 9C

| Cooled reagent storage | Reagent name | Storage temperature | Heated reagent storage | Reagent name | Storage temperature |
|---|---|---|---|---|---|
| A | 0.5%TBST | Room temperature | H | 1.0×SSC | 70°C |
| B | Hoechst33342 | Room temperature | I | None | — |
| C | None | — | J | None | — |
| D | None | — | K | None | — |
| E | None | — | L | None | — |
| F | None | — | M | None | — |
| G | None | — | N | None | — |

PRETREATMENT APPARATUS AND PRETREATMENT METHOD

CROSS REFERENCE TO RELATED APPLICATIONS

This application claims priority from prior Japanese Patent Application No. 2016-243860, filed on Dec. 15, 2016, entitled "Pretreatment apparatus and pretreatment method", the entire contents of which are incorporated herein by reference.

FIELD OF THE INVENTION

The present invention relates to a pretreatment apparatus and a pretreatment method for automatically performing pretreatment of a sample before analyzing a sample by flow cytometry or the like.

BACKGROUND

When analyzing cells, for example, by flow cytometry or the like, cell pretreatment is required prior to analysis. In pretreatment, cells may be stained to facilitate detection of cells. Japanese Patent Application Publication No. 2015-508177 discloses a system for cell pretreatment. The pretreatment disclosed in Japanese Patent Application Publication No. 2015-508177 is for preparing a sample for analysis of CD4 (cluster of differentiation 4) in an HIV infection culture. The pretreatment of Japanese Patent Application Publication No. 2015-508177 includes dispensing CD4 reagent to whole blood, mixing by vortexing, culturing, dispensing of a lysis solution, centrifugation, washing, and disposal of surplus liquid. Japanese Patent Application Publication No. 2015-508177 discloses performing these pretreatments at room temperature. As shown in FIG. 16, the apparatus of Japanese Patent Application Publication No. 2015-508177 includes a centrifugal separation device 4. Japanese Patent Application Publication No. 03-17536 discloses a cell pretreatment apparatus that performs dispensing of a reagent, centrifugation, and removal of a supernatant. As shown in FIGS. 17 and 18, the cell pretreatment apparatus of Japanese Patent Application Publication No. 03-17536 includes a first temperature control tank 15, a second temperature control tank 16, a third temperature control tank 17. The temperature of the first temperature control tank 15 is fixed at 4° C., the temperature of the second temperature control tank 16 is fixed at 40° C., and the temperature of the third temperature control tank 17 is fixed at 30° C. A concave hole 18 is formed on the upper surface of each temperature control tank and the sample tube 2 containing sample is rotated in conjunction with the rotation of the sample disc 1 provided for centrifugal separation or the like, and the tube 2 is lifted above a predetermined temperature control tank, inserted into the recessed hole 18 of the temperature control tank, and held at a predetermined temperature.

SUMMARY OF THE INVENTION

However, in the pretreatment apparatuses of Japanese Patent Application Publication No. 2015-508177 and Japanese Patent Application Publication No. 03-17536, each step of pretreatment may not be performed at an appropriate temperature and a sample suitable for analysis may not be obtained in some cases depending on the analysis item.

One aspect of the present invention is a cell pretreatment apparatus (100). In an embodiment, the cell pretreatment apparatus (100) performs pretreatment of the sample that includes at least a centrifugation. The pretreatment apparatus (100) is provided with a holder (610) for holding a container (10) containing a sample, a centrifugal separation device (600) for rotating the container (10) in the holder (610) to perform a centrifugal separation, a temperature adjustment device (420) for adjusting the temperature of the sample in the container (10) in the holder (610), an input device (320) for receiving from a user a designated temperature to be adjusted by the temperature adjustment device (420), a controller (300) for controlling the temperature adjustment device (420) in accordance with the designated temperature received via the input section (320). The pretreatment process can be easily executed at a temperature desired by the user by controlling the temperature adjustment device according to the designated temperature received from the user.

It is preferable to further provide a housing (400) in which the centrifugal separation device (600) is housed, and the temperature adjustment device (420) is provided in the housing (400). In this case, the temperature inside the housing can be adjusted to a temperature desired by the user.

It is preferable to further provide a dispenser (210) for dispensing a reagent into the container (10) held by the holder (610).

It is preferable to further provide a display (310) for displaying a setting screen (1000) for specifying temperature. The temperature can be specified easily by setting screen. It is preferable that the setting screen (1000) can designate a numerical value indicating the temperature.

In the setting screen (1000), it is preferable that a plurality of operation contents included in pretreatment can be set, and a plurality of temperatures for the plurality of operations can be set. In this case, the temperature can be set according to the operation.

The setting screen (1000) preferably can be set to perform or not perform an operation included in pretreatment while switching from a first temperature included in the plurality of temperatures to a second temperature included in the plurality of temperatures. In this case, it is possible to set whether to perform the operation during the temperature switching.

It is preferable that the setting screen (1000) can set the temperature of the reagent. In this case, the temperature of the reagent installing part also can be set.

It is preferable that the input device (320) receives from the user a designation of temperature for each of a plurality of modes corresponding to the analysis items, the display (310) displays a selection screen (800) for selecting one of a plurality of modes according to the analysis items, and the controller (300) controls the temperature adjustment device (420) according to the temperature specified in the mode selected on the selection screen (800). In this case, it is possible to adjust the temperature according to the mode.

Preferably, the controller (300) includes a storage (34) for storing information indicating the designated temperature received through the input device (310). In this case, information indicating the temperature can be stored.

A reagent setting part (220, 230) in which a reagent is installed, and a reagent temperature adjusting part (221, 231) for adjusting a temperature of a reagent installed in the reagent installing part (220, 230) also are preferably provided, and the input device (310) receives from a user the reagent temperature information indicating the temperature of the reagent installing part (220, 230), and the controller (300) controls the reagent temperature according to the temperature indicated by the reagent temperature information part (221, 231). In this case, the temperature of the reagent can also be adjusted by user specification.

It is preferable that the pretreatment further includes fixing and permeabilizing the cells contained in the sample.

A dispenser for dispensing first and second reagents into the container held by the holder, and a housing for internally housing the centrifugal separation device also are preferably provided, and the temperature adjusting part adjusts the ambient temperature within the housing, and the controller controls the performance of a first reaction of a sample and a first reagent in a container in the housing, a centrifugal separation to remove unreacted components of the first reaction, a second reaction of the sample and a second reagent, and controls the switching of the ambient temperature within the housing by the temperature adjusting part so that the temperature in the first reaction and the temperature in the second reaction are respectively different. In this case, the first reaction and the second reaction can be carried out at appropriate temperatures, respectively. Note that the ambient temperature is the temperature of the atmosphere in the container.

It is preferable that the controller executes other operation included in the pretreatment while the ambient temperature in the housing is switched. In this case, switching of the temperature and other operation can be executed in parallel. It is preferable that the other operation includes another centrifugal separation different from the centrifugal separation for removing the unreacted components performed by the centrifugal separation device.

The controller may perform controls to start the second reaction after the ambient temperature in the housing has been switched. In this case, the second reaction can be reliably executed at the temperature after switching.

At least one of the first reagent and the second reagent is preferably a staining reagent for staining the cells contained in the sample. It also is preferable that the first reagent is a staining reagent for staining a surface antigen of a cell, and the second reagent is a staining reagent for staining a target substance in a cell.

The housing (400) has an entry port (432) for allowing the dispensing tube (21) of the dispenser (210) to enter into the housing (400) from outside the housing (400), and an operating device (45) for opening and closing the entry port opening (432). Access to the inside of the housing becomes possible via the entry port. Also, even if the entry port is provided, by closing the entry port opening by the operating device, it is possible to suppress temperature change in the housing.

It is preferable that a convection generation device (421, 322) for generating a convection in the housing (400) from the temperature adjusting part (420), through the container (10) and returning to the temperature adjusting part (420), and, when the entry port is opened by the operating device, the controller (300) controls the convection generation device so as to weaken the convection more than when the entry port is closed. When the entry port is open, weakening the convection can suppress temperature change in the housing.

It is preferable that a motor (630) for rotating the centrifugal separation device provided in the housing is further provided, and the motor (630) is provided outside the housing. In this case, it is possible to prevent the heat generation of the motor from influencing the temperature inside the housing.

It is preferable that the controller (300) rotates a centrifugal separation device (600) provided in the housing when the ambient temperature in the housing is adjusted by the temperature adjustment device. The interior of the housing (400) is agitated and the temperature inside the housing (400) can be made uniform by the rotation of the centrifugal separation device. Note that the rotation of the centrifugal separation device need not be performed for centrifugal separation but only for agitation in the housing (400).

The pretreatment may be pretreatment for analysis of pretreatment for Fluorescence In Situ Hybridization (FISH) analysis. Since these pretreatments are desirable at different temperatures, appropriate pretreatment can be done by temperature switching.

Viewed from another perspective, the pretreatment apparatus (100) includes a holder (610) for holding a container (10) in which a sample is accommodated, and a pretreatment device (201) for performing pretreatment of the sample including a reaction of the sample and a reagent in the container held in the holder; a temperature adjustment device (420) for adjusting the temperature of the sample in the container (10) in the holder (610); a reagent installing part (220, 230) in which the reagent is installed; a reagent temperature adjustment device (221, 231) for adjusting the temperature of the reagent installed in the reagent installing part (220, 230); an input device (320) for receiving from the user a designation of the temperature to be adjusted by the temperature adjustment device (221, 231) and the temperature to be adjusted by the reagent temperature adjustment section (221, 231); and a controller (300) for controlling the temperature adjustment device (420) and the reagent temperature adjustment device (221, 231) according to the temperature received designation via the input device (320).

Viewed from another perspective, the pretreatment apparatus (100) includes a pretreatment device (201) for pretreating a sample including a reaction step between the sample and a reagent, a temperature adjustment device (420) for adjusting the temperature of the sample to be processed by the pretreatment device (201); an input device (310) for receiving, from a user, the settings of an operation mode including a plurality of operation contents of the pretreatment device (201) and a temperature adjusted by the temperature adjustment device (420) when performing each operation content; and a controller (300) for controlling the pretreatment device (201) and the temperature adjustment device (420) according to the operation mode set via the input device (310).

Viewed from another perspective, the pretreatment apparatus (100) includes a centrifugal separation device (600) for holding and centrifugally separating a container (10) containing a sample, a dispenser (210) for dispensing a first reagent and a second reagent into the container (10) held by the centrifugal separation device (600), and a pretreatment device (201) having a housing (400) for internally housing the centrifugal separation device (600), a temperature adjustment device (420) for adjusting the ambient temperature in the housing (400), and a controller (300) for controlling pretreatment so as to perform a first reaction of the sample and a first reagent in the container in the housing, a centrifugal separation of removing unreacted components of the first reaction, and a second reaction of the sample and a second reagent, and controlling the switching of the ambient temperature within the housing by the temperature adjustment device so that the first reaction and the second reaction are performed at respectively different temperatures.

Viewed from another perspective, the pretreatment apparatus (100) includes a pretreatment device (201) having a holder (610) for holding a container containing a sample, a dispenser (210) with a dispensing tube for dispensing a first reagent and a second reagent into the container held by the holder; a temperature adjustment device (420) for adjusting the ambient temperature in the housing, a reagent installing part (220, 230) in which the first reagent and the second reagent are installed, a reagent temperature adjustment device (221, 231) for adjusting the temperatures of the first reagent and the second reagent installed in the reagent installing part; a controller (300) for controlling the pretreatment device to perform a first reaction of reacting the sample and the first reagent in the container by causing the dispensing tube to suction the first reagent from the reagent installing part and inserting the dispensing tube into the housing and dispensing the first reagent into the container held by the holder, and perform a second reaction of reacting the sample and a second reagent by causing the dispensing tube to suction the second reagent from the reagent installing part and inserting the dispensing tube into the housing and dispensing the second reagent into the container held by the holder, and for controlling the temperature adjustment device and the reagent temperature adjustment device so that the temperature of the first reagent and the ambient temperature within the housing in the first reaction and the and the temperature of the second reagent and the ambient temperature within the housing in the second reaction are different.

Viewed from another perspective, the pretreatment apparatus (100) includes a pretreatment device (201) having a centrifugal separation device (600) for holding and centrifugally separating a container containing a sample, and dispenser (210) for dispensing reagent through a dispensing tube into the container held by the centrifugal separation device, a disposal part (273) for discarding the supernatant in the container by tilting the container, and a controller (300) for controlling the pretreatment device so as to perform a reaction between the sample and the reagent and a centrifugation after the reaction, wherein, after the centrifugal separation, the controller (300) (*i*) controls the dispenser to insert the dispensing tube into the container held by the centrifugal separation device and discard the supernatant in the container, or (ii) controls the disposal part to remove the container from the centrifugal separation device and tilt the container to discard the supernatant within the container.

Another aspect of the present invention is a pretreatment method. In the method according to this aspect, the designation of a temperature is received from a user, the temperature adjustment device is controlled so as to adjust the temperature inside the container held in the centrifugal separation device according to the received designated temperature, and the temperature-adjusted container is rotated to perform the centrifugal separation.

Viewed from another perspective, in the pretreatment method, designation of the temperature of the sample and the temperature of the reagent is received from the user, the temperature adjustment device adjusts the temperature of the sample and the temperature of the reagent according to the received designated temperature, and the reaction between the temperature-adjusted sample and the reagent is carried out.

Viewed from another perspective, the pretreatment method displays a setting screen for setting an operation mode of a pretreatment that performs pretreatment of a sample, and, settings associated with a plurality of operation contents and the temperature of the sample when performing each operation content are received from a user on the setting screen and associated with the operation mode, and the pretreatment operation of the pretreatment apparatus is controlled according to the set operation mode.

Viewed from another perspective, the pretreatment method adjusts the ambient temperature within a housing in which a container containing a sample is held and subjected to centrifugal separation to a first temperature and performs a first reaction between the sample and a first reagent in the container within a housing in which the ambient temperature has been adjusted to a first temperature, performs a centrifugal separation to remove unreacted components, switches the ambient temperature within the housing from the first temperature to a second temperature, and performs a second reaction between the sample and a second reagent in the housing where the ambient temperature has been switched to the second temperature.

Viewed from another perspective, the pretreatment method adjusts the ambient temperature and the first reagent in a housing holding a container containing a sample to a first temperature, inserting a dispensing tube that has suctioned the temperature-adjusted first reagent into the temperature-adjusted housing and dispensing the suctioned first reagent into the container, adjusting the temperature of a second reagent and the ambient temperature in the housing to a second temperature that is different from the first temperature, inserting the dispensing tube that suctioned the temperature-adjusted second reagent into the temperature-adjusted housing and dispensing the second reagent into the container.

Viewed from another perspective, the pretreatment method performs a centrifugal separation via a centrifugal separation device by rotating a container containing a sample, and performing (i) a supernatant disposal operation in which the supernatant in the container is suctioned by a dispensing tube and discarded, or (ii) a supernatant disposal operation in which the container is removed from the centrifugal separation device and tilted to discard the supernatant in the housing.

BRIEF DESCRIPTION OF THE DRAWINGS

FIG. 8 is a table showing reagents set in a reagent storage;
FIG. 9C is a table showing reagents set in a reagent storage;
FIG. 10B is a table showing reagents set in a reagent storage;
FIG. 11 is a diagram of a setting screen;

FIG. 12A is a diagram of a setting screen;
FIG. 13 is a diagram of a setting screen;
FIG. 14A is a diagram of an operation condition setting screen;
FIG. 15 is a diagram of a setting screen.

DESCRIPTION OF THE EMBODIMENTS OF THE INVENTION

Figure 1A:
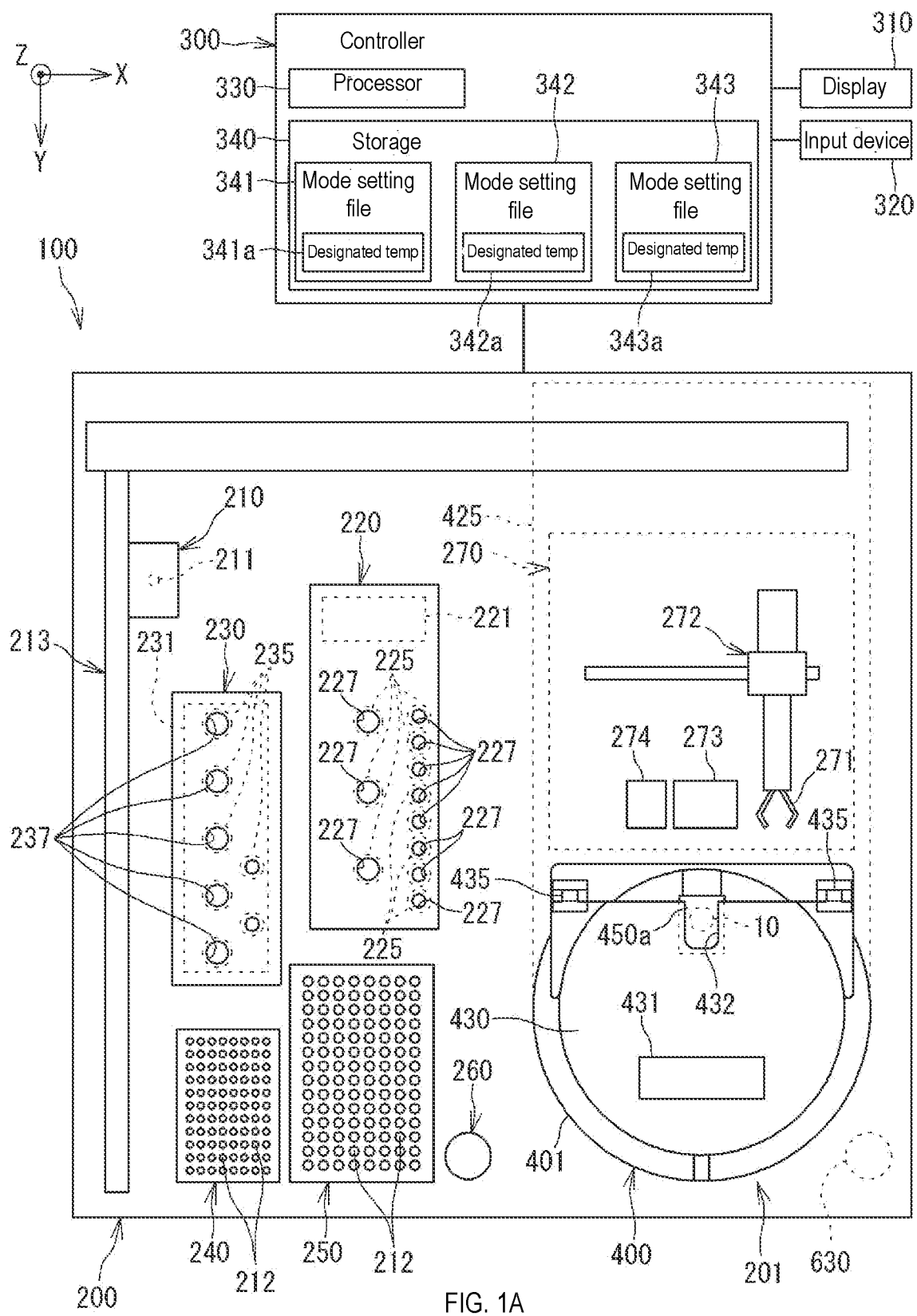
FIG. 1A is a plan view of a pretreatment apparatus.

The pretreatment apparatus 100 shown in FIG. 1A performs pretreatment of a sample and prepares the sample to be used for sample analysis. In an embodiment, the sample contains cells. A sample containing cells, for example, may be a blood sample, and more specifically, for example, a whole blood sample. Pretreatment is carried out, for example, for cell staining and includes a plurality of steps. In the embodiment, the plurality of steps includes steps other than the staining step and the cell staining step.

The sample adjusted by the pretreatment apparatus 100 is analyzed by the analyzer. The analyzer has, for example, a flow cytometer. The flow cytometer optically analyzes the sample. In the embodiment, the pretreatment apparatus 100 is a separate apparatus from the analyzer, but the analyzer may be provided with the pretreatment apparatus 100.

In FIG. 1, the XYZ axes are orthogonal to each other. The X axis indicates the left and right directions, the Y axis indicates the front and rear, and the Z direction indicates the vertical directions. Hereinafter, the positive direction of the Y axis is the front side of the apparatus 100, and the positive direction of the Z axis is the vertically upward direction. Also in the drawings below, the XYZ axes are the same as the XYZ axes shown in FIG. 1.

Figure 2:
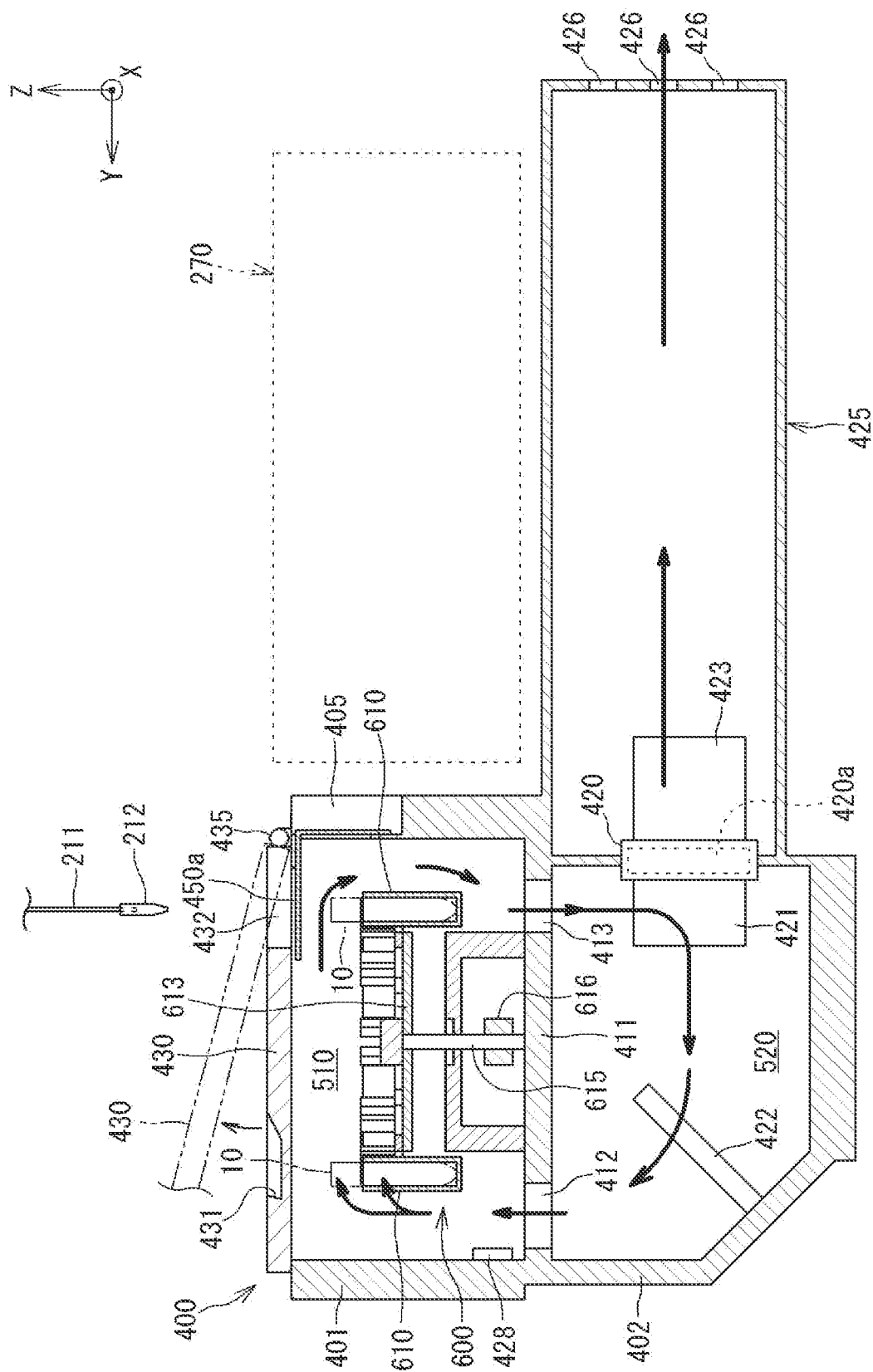
FIG. 2 is a cross-sectional view of a housing.

As shown in FIG. 1A, the pretreatment apparatus 100 includes an apparatus body 200. The apparatus body 200 includes a pretreatment device 201. The pretreatment device 201 includes a dispenser 210. The dispenser 210 dispenses reagents and the like to the container 10 which contains a sample. The dispenser 210 includes a nozzle 211. As shown in FIG. 2, a pipette tip 212 which is a disposable dispensing tube is attached to the nozzle 211. The nozzle 211 suctions and discharges a liquid via the pipette tip 212. The suction of the liquid is performed by applying a negative pressure to the nozzle 211 by a syringe (not shown), and the liquid is discharged by applying a positive pressure to the nozzle 211 by a syringe (not shown).

The dispenser 210 shown in FIG. 1A includes a transport part 213 of the nozzle 211. The transport part 213 moves the nozzle 211 in the XYZ axis direction in the apparatus body 200. The transport part 213 has a motor (not shown), and the nozzle 211 is moved by driving the motor.

As shown in FIG. 1A, the apparatus body 200 includes a first reagent installing part 220. A reagent for pretreatment is installed in the first reagent installing part 220. The apparatus body 200 also includes a second reagent installing part 230. A reagent for pretreatment is also installed in the second reagent installing part 230. The reagent installing parts 220 and 230 of the embodiment are configured as reagent storages in which reagents are installed.

Reagent containers 225 and 235 containing reagents are installed inside the reagent installing parts 220 and 230. In FIG. 1A, eleven reagent containers 225 can be installed in the first reagent installing part 220, and seven reagent containers 235 can be installed in the second reagent installing part 230. A plurality of openings 227 and 237 are formed in the reagent installing parts 220 and 230, respectively. The openings 227 and 237 are formed above the reagent containers 225 and 235 installed in the reagent installing parts 220 and 230. The openings 227 and 237 are for the nozzle 221 to enter the reagent installing parts 220 and 230 from above the reagent installing parts 220 and 230.

When suctioning the reagent, the nozzle 211 is moved by the transport part 213 to just above the reagent containers 225 and 235 containing the reagent to be suctioned. Subsequently, the nozzle 211 is moved downward by the transport part 213 and enters into the reagent containers 225 and 235 from a position right above the reagent container 225 through the openings 227 and 237. Then, the nozzle 211 suctions the reagent in the reagent containers 225 and 235.

The reagent installing parts 220 and 230 of the embodiment include reagent temperature adjustment devices 221 and 231 inside to keep the temperature of the reagent installed therein at a desired temperature.

In the embodiment, the first reagent installing part 220 is a cooled reagent storage capable of cooling the reagents therein. The first reagent installing part 220 includes a cooling device as the first reagent temperature adjustment device 221 for cooling. The cooling device is configured by, for example, a Peltier element. The cooling device also may be a compressor or other cooling device. The temperature in the first reagent installing part 220 is measured by a temperature sensor (not shown).

In the embodiment, the second reagent installing part 230 is a heated reagent storage capable of heating the reagents therein. The second reagent installing part 230 includes a heating device as the second reagent temperature adjustment device 231 for heating. The heating device is configured by, for example, a block heater. The heating device also may be another heater. The temperature inside the second reagent installing part 230 is measured by a temperature sensor (not shown). The second reagent installing part 230 can also hold the reagent at room temperature.

The apparatus body 200 shown in FIG. 1A includes a first chip installing part 240 and a second chip installing part 250. Pipette tips 212 to be attached to the nozzles 211 are installed in the chip installing parts 240 and 250. A pipette chip 212 that larger than the pipette chip 212 installed in the first chip installing part 240 is installed in the second chip installing part 250. Both large and small pipette tips 212 can be attached to the nozzle 211. A pipette tip 212 of a size corresponding to the dispensing amount of the reagent is attached to the nozzle 211.

The pipette tip 212 is made of a nonmetallic material, more specifically, a plastic. Plastic has lower thermal conductivity than metal. When the temperature of the chip 212 differs greatly from the temperature in the housing 400 (described later), the temperature of the housing 400 can easily fluctuate when a chip 212 having high thermal conductivity is allowed to enter the accommodating section 400.

On the other hand, even if the plastic chip 212 is inserted into the housing 400, the temperature change of the housing 400 can be suppressed.

Prior to suction of the reagent or the like, the nozzle 211 is moved by the transport part 213 to just above the pipette tip 212 on which it is to be mounted. Subsequently, the nozzle 211 is moved downward toward the pipette tip 212 by the transport part 213. As a result, the pipette tip 212 is attached to the lower end of the nozzle 211. Note that the used pipette chip 212 is discarded in the disposal part 260.

The pretreatment device 201 includes an external treatment part 270 that can perform a part of the steps in pretreatment outside the housing 400 (described later). Unlike the housing 400 (described later), the external treatment part 270 does not perform temperature adjustment, and can perform a part of the processes in the pretreatment at room temperature. In pretreatment, the external treatment part 270 may or may not be used.

The external treatment part 270 according to the embodiment includes a holder 271 that holds the container 10 containing the sample outside the housing 400. The holder 271 moves into the housing 400 by a moving device 272 for moving in the XY direction, passes through an entry port 405 described later, grips the container 10 of the housing 400 and removes the container 10 from the housing 400.

The external treatment part 270 of the embodiment includes a disposal part 273 for discarding the supernatant in the container 10. The holder 271 can discard the supernatant in the container 10 to the disposal part 273 by decanting the container 10 by the moving part 272. The external treatment part 270 of the embodiment includes a mixing part 274 for liquid in the container 10. The mixing part 274 is, for example, a vortex mixer that stirs and shakes the liquid in the container 10 held by the holder 271. In the embodiment, the external treatment part 270 can perform the supernatant removal step and the mixing step at room temperature, but the external treatment part 270 is configured so that steps other than the supernatant removal step and the mixing step also can be performed at room temperature.

The pretreatment device 201 includes a housing 400 in which pretreatment is performed internally. A centrifugal separation device 600 is housed inside the housing 400. The surroundings of the housing 400 are covered with a heat insulating material to easily maintain the internal temperature. In the embodiment, since the pretreatment includes a reaction step between the sample and a reagent, the housing 400 may be referred to as a "reaction tank" in the following description. As shown in FIG. 2, the housing 400 includes a tank body 401. In the embodiment, each step in the pretreatment is performed in the tank body 401.

The tank body 401 is a substantially cylindrical container. The top of the tank body 401 is open. The housing 400 is provided with a lid 430 covering the upper opening of the tank body 401. The lid 430 is attached to the tank body 401 via a hinge 435. The lid 430 can be manually opened and closed. A concave handle 431 is formed on the upper surface of the lid 430 so that the lid can be grasped by hand during manual opening and closing.

The lid 430 is formed with an entry port 432 for entering into the housing 400 from above the housing 400. As shown in FIG. 1A, the entry port 432 of the embodiment is a U-shaped notch formed at the edge of the lid 430. When dispensing reagent into the container 10 in the housing 400, as shown in FIG. 2, the nozzle 211 that suctioned the reagent is moved directly above the entry port 432 by the transport part 213. Subsequently, the nozzle 211 is moved downwards by the transport part 213, passes through the entry port 432, and enters the housing 400. Then, the nozzle 211 discharges the reagent to the container 10. In this way the reagent is dispensed into the container 10.

Figure 3A:
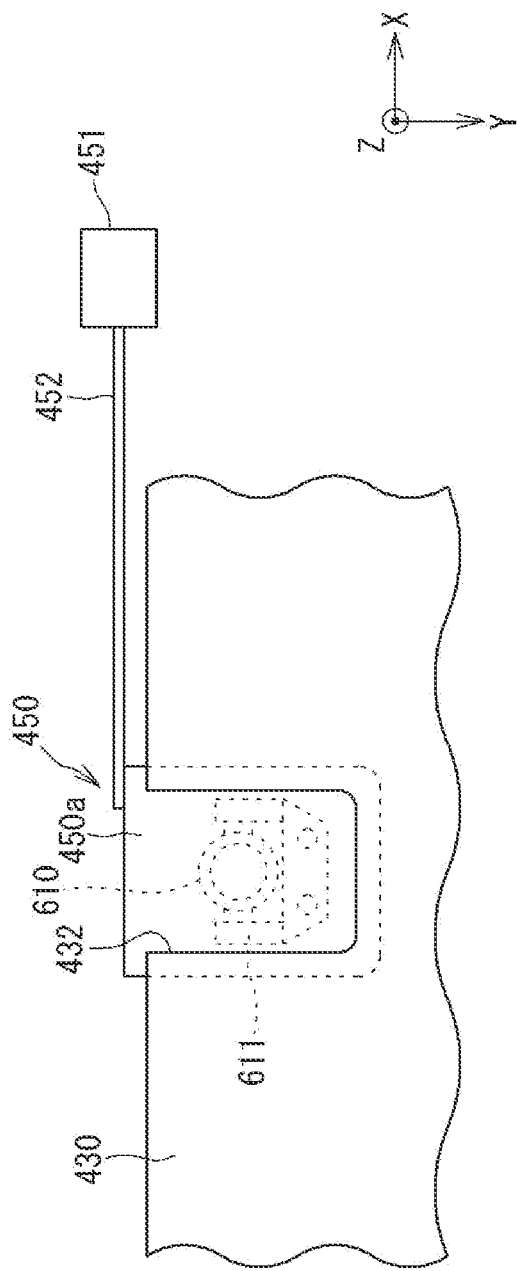
FIGS. 3A and 3B are partial enlarged views of a housing.
Figure 3B:
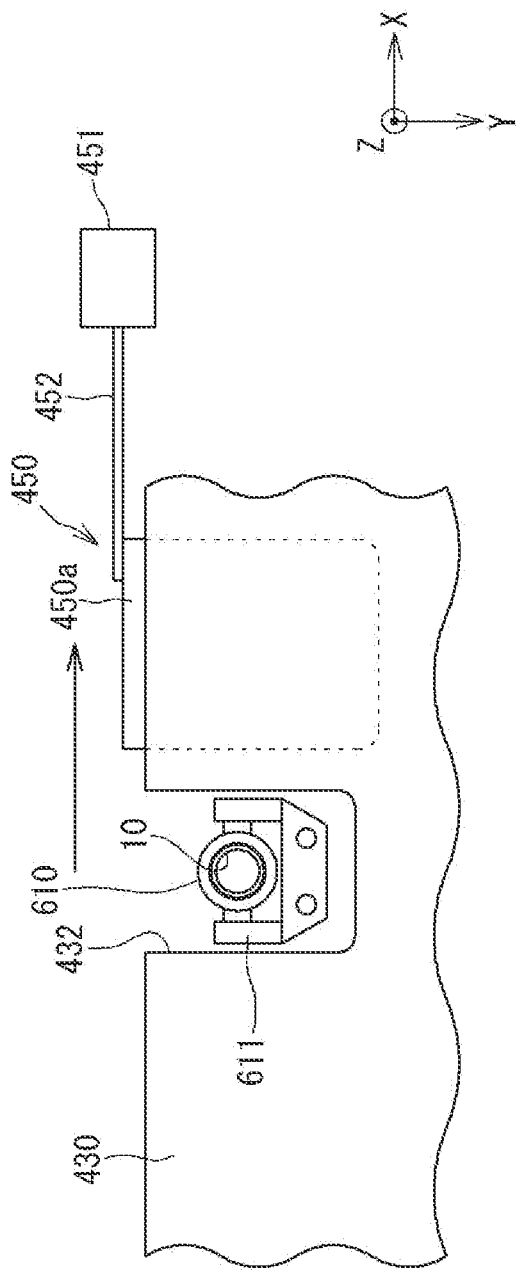

As shown in FIG. 3 (a), the housing 400 is provided with an operating device 450 for opening and closing the entry port opening 432. The operating device 450 of the embodiment includes a shutter 450a for closing the entry port 432 and a drive part 451 for opening and closing the shutter 450. The shutter 450a and the driving part 451 are connected by a connecting part 452. The driving part 451 is, for example, a solenoid, and moves the shutter 450a in the Y-axis direction. As shown in FIG. 3A, when the entry port 432 is closed by the shutter 450a, it is possible to prevent leakage of cold air or hot air in the housing 400 and to suppress temperature fluctuation in the housing 400. As shown in FIG. 3 (b), when the shutter 450a moves and the entry port 432 is opened, as shown in FIG. 2, the nozzle 211 is inserted into the housing 400 from above the entry port 432.

As shown in FIG. 2, the tank body 401 is also formed with an entry port 405 for entering into the housing 400 from behind the housing 400. The entry port 432 is for allowing the holder 271 of the external treatment part 270 to enter the inside of the housing 400. As shown in FIG. 2, the shutter 450a is formed in an L shape in a side view so as to close the entry port 432 together with the entry port 451.

Normally, the shutter 450a closes the entry ports 432 and 405. The shutter 450a opens the entry ports 432 and 405 before the nozzle 211 or the holder 271 enters the housing 400, and closes the entry ports 432 and 405 when the nozzle 211 or 271 comes out of the housing 400. In this way, since the entry ports 432 and 405 are opened only when necessary, it is possible to prevent the internal temperature of the housing 400 from being affected by the external temperature of the housing 400.

Figure 4A:
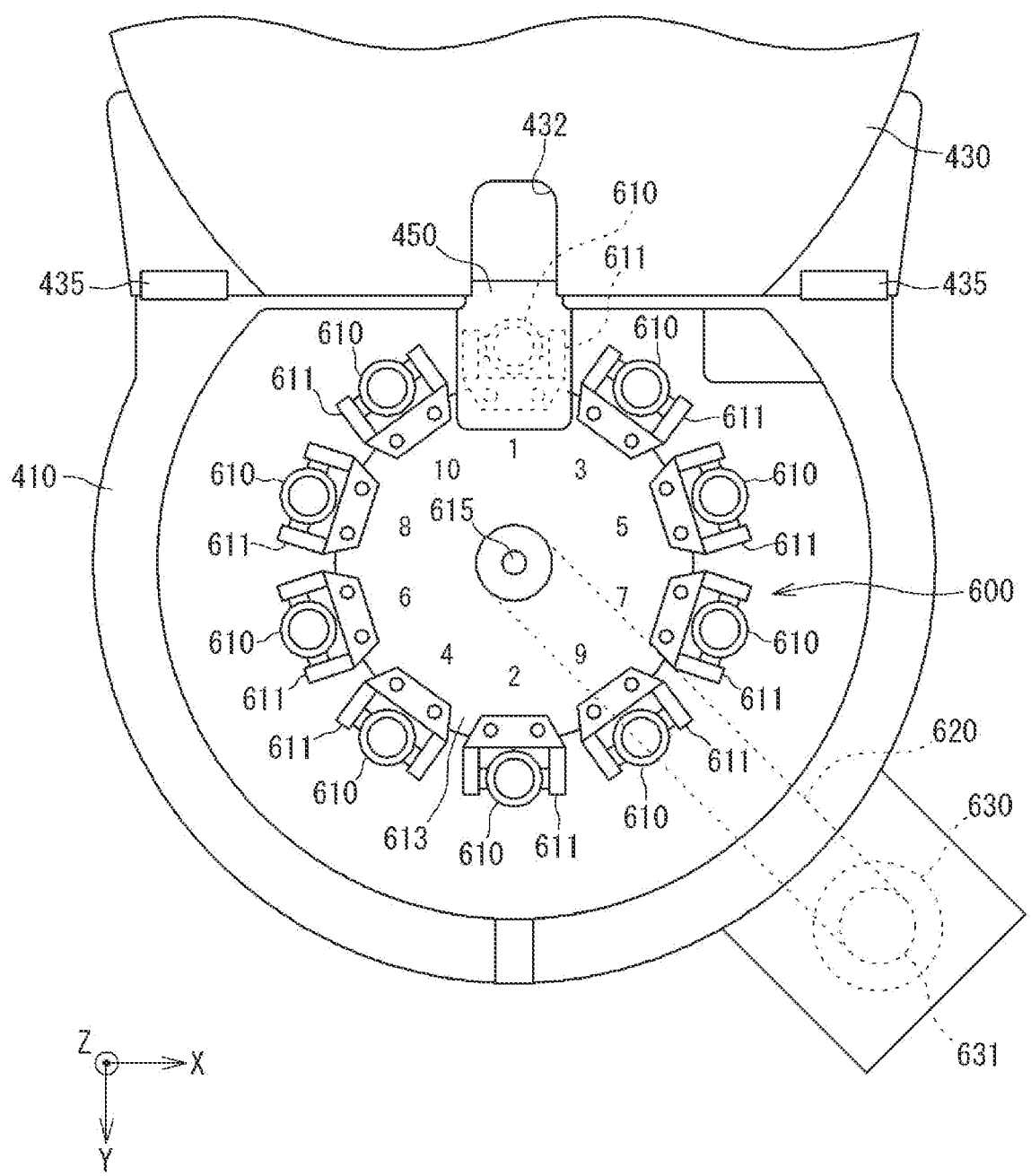
FIG. 4A is a plan view of the interior of the housing.

Pretreatment of the sample is performed in the tank body 401. As shown in FIG. 2, inside the tank body 401, a holder 610 is provided to hold the container 10 containing the sample. The holder 610 of the embodiment is provided in the centrifugal separation device 600. The centrifugal separation device 600 is supported by a bottom part 411 of the tank body 401. As shown in FIG. 4A, the centrifugal separation device 600 has a rotor 613 on which a plurality of holders 610 are attached at the outer periphery. The rotation of the rotor 613 centrifugally separates the liquid in the container 10 held by the holder 610.

The holder 610 is supported by the rotor 613 via the support member 611. The rotor 613 in FIG. 4A is provided with ten holders 610. On the upper surface of the rotor 613, numerals 1 to 10 are attached near the holder 610. The numeral attached to the rotor 613 indicates to the user the position of the holder 610 where the container 10 is to be installed. Numbers adjacent to each other from 1 to 10 are arranged oppositely across the center of the rotor 63 to make it easier to understand where to install the container 10 in the holder 610.

Figure 4B:
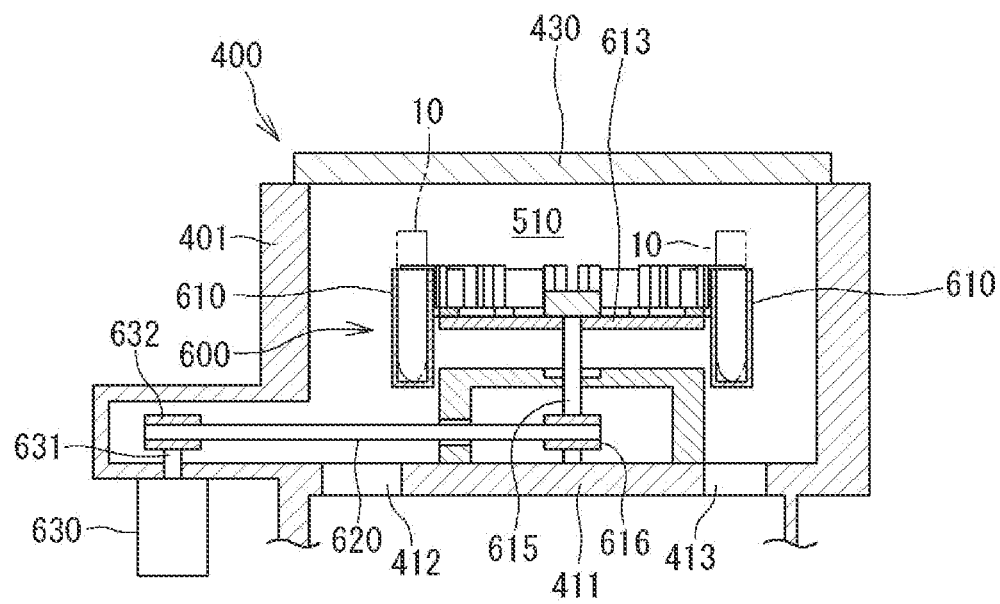
FIG. 4B is a cross-sectional view of the housing.

The centrifugal separation device 600 has a rotary shaft 615 serving as a rotational center of the rotor 613. The rotating shaft 615 is rotatably supported relative to the bottom part 411. As also shown in FIG. 4B, a pulley 616 is provided under the rotating shaft 615. The rotating shaft 615 is rotationally driven by a motor 630. A pulley 632 is provided on the rotating shaft 631 of the motor 630. A belt 620 is wound between the pulley 616 and the pulley 632. The rotation of the motor 630 is transmitted to the rotating shaft 615 in the tank body 401 via the belt 620. The rotation of the rotating shaft 615 causes the rotor 613 to rotate. The motor 630 is attached to the housing 400 outside the housing 400. The rotating shaft 631 of the motor 630 passes through the housing 400, and the pulley 632 is located in the housing 400. The belt 620 is located in the housing 400. By arranging the motor 630 outside the housing 400, it is possible to prevent the heat generated by the motor 630 from affecting the temperature inside the housing 400.

The housing 400 shown in FIG. 2 includes a temperature adjusting tank 402 provided at a lower part of the tank body 401. A space between the tank body 401 and the temperature adjustment tank 402 is partitioned by a bottom part 411 of the tank body 401. The bottom part 411 is a partition between a first chamber 510 in the tank body 401 and a second chamber 520 in the temperature adjustment tank 402. Through holes 412 and 413 are formed so the first chamber 510 and the second chamber 520 communicate at the bottom part 411, which is the partition. As will be described later, through holes 412 and 413 form a convection circulating through the first chamber 510 and the second chamber 520. The convection promotes the uniformization of the temperature inside the housing 400.

In the temperature adjustment tank 402, a temperature adjustment device 420 is provided for adjusting the ambient temperature in the housing 400. The temperature adjustment device 420 of the embodiment has a Peltier device 420a. The temperature adjustment device 420 can regulate the inside of the housing 400 to a desired temperature. The temperature adjustment device 420 can maintain the inside of the housing 400 at a temperature higher than room temperature by heating the inside of the housing 400. The temperature adjustment device 420 also can cool the inside of the housing 400 and maintain the inside of the housing 400 at a temperature lower than room temperature. The temperature adjustment device 420 also can maintain the temperature of the housing 400 at a constant temperature approximately equal to room temperature. In order to monitor the temperature inside the housing 400, a temperature sensor 428 is provided in the tank body 401. In FIG. 2, the temperature sensor 428 is provided in the vicinity of the through hole 412. The temperature sensor 428 also may be provided in the temperature adjustment tank 402.

In the temperature adjustment tank 402, there are provided convection generating devices 421 and 422 for causing convection in the housing 400. The convection generating devices 421 and 422 of the embodiment include a first fan 421 and a second fan 422 that feed hot air or cold air generated by the temperature adjustment device 420 to the tank body 401. The fans 421 and 422 cause convection in the housing 400. Among the plurality of through holes 412 and 413, the convection flows from the second chamber 520 toward the first chamber 510 at the first through hole 412 at a position away from the temperature adjustment device 420, and from the first chamber 510 toward the second chamber 520 at the second through hole 412 positioned above the temperature adjustment device 420.

The first fan 421 is disposed below the second through hole 413. The first fan 421 generates an air current flowing horizontally in the temperature adjustment tank 402 so as to send the hot air or the cold air generated by the temperature adjustment device 420 to the side of the first through hole 412 located away from the temperature adjustment device 420. The second fan 422 is disposed below the first through hole 412. The second fan 422 is disposed so as to convert the horizontal airflow generated by the first fan 421 into an upward airflow directed toward the upper first through hole 412.

The air flow entering the first chamber 510 from the first through hole 412 passes through the vicinity of the holder 610 and proceeds toward the second through hole 413. The first fan 421 disposed below the second through hole 413 draws an air current from the second through hole 413. In this way, a convection circulating in the first chamber 510 and the second chamber 520 is formed by the first fan 421 and the second fan 422, and hot air or cold air generated by the temperature adjustment device 420 is caused to flow into the first chamber 510, thereby efficiently adjusting the temperature in the first chamber 510. Note that the temperature distribution in the first chamber 510 can be made more uniform by rotating the rotor 613 during pretreatment.

The second fan 422 stops when the shutter 450a opens the entry port 432. Convection is weakened by stopping the second fan 422. By weakening the convection, it is possible to prevent hot air or cold air inside the housing 400 from escaping to the outside of the housing 400 from the entry port 432. Note that, weakening the convection also may be accomplished by decreasing the rotation speed of the first fan 421 and the second fan 422. Since the entry port 432 is provided above the second through-hole 413, hot air or cold air in the housing 400 is prevented from escaping to the outside of the housing 400 from the entry port 432. An air flow directed from the top to the bottom is generated in the second through hole 413 so that hot air or cold air from the entry port 432 in the upper part of the housing 400 is unlikely to escape.

The housing 400 shown in FIG. 2 includes a heat exhaust 425 provided at the rear of the temperature adjustment tank 402. The heat exhaust 425 is for allowing the cold waste heat or the warm exhaust heat generated by the temperature adjustment device 420 to escape to the outside of the apparatus body 200. The heat exhaust 425 includes a fan 423 for flowing the cold waste heat or warm exhaust heat generated by the temperature adjustment device 420 to the rear, and a duct 425a for guiding the air current generated by the fan 423 to the rear side of the apparatus body 200. An exhaust port 426 connected to the outside of the apparatus body 200 is formed at the rear part of the duct 425a. The duct 425a is disposed below the external treatment part 270. By disposing the temperature adjustment tank 402 below the tank body 401, the position of the duct 425 also becomes the lower position, and the lower space of the external treatment part 270 can be effectively utilized.

Figure 4C:
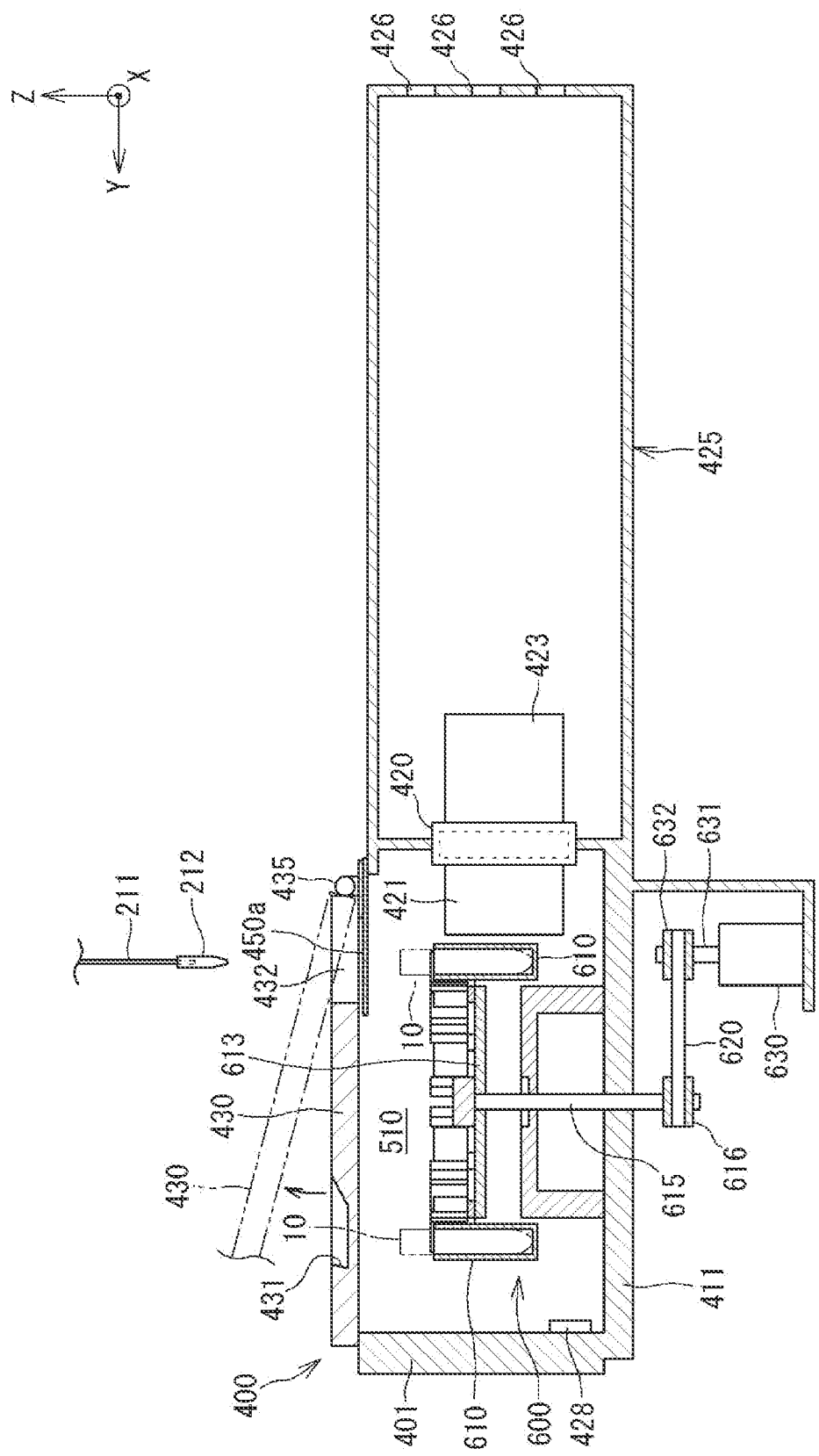
FIG. 4C is a cross-sectional view of the housing.

As shown in FIG. 4C, the temperature adjustment device 420 may be provided in the tank body 401. In FIG. 4C, the temperature adjustment device 420 is provided inside the rear side of the tank body 401. As shown in FIG. 4C, the temperature adjustment tank 402 can be omitted when the temperature adjustment device 420 is provided in the tank body 401. In FIG. 4C, the duct 425a is disposed at the same height as the tank body 401.

Figure 4D:
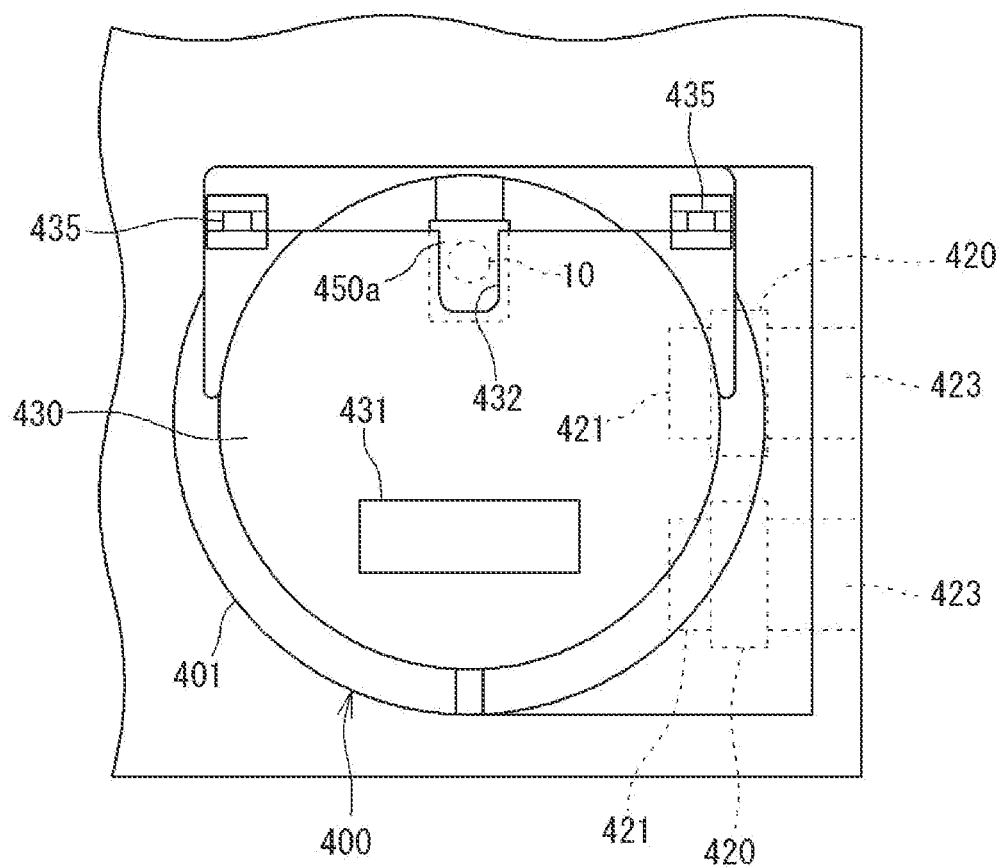
FIG. 4D is a plan view of the housing.

In FIG. 4C, the lower part of the rotating shaft 615 of the centrifugal separation device 600 passes through the bottom part 411 and extends to the outside of the housing 400. Also in FIG. 4C, the motor 630 for rotationally driving the rotating shaft 615 is disposed outside the housing 400. In FIG. 4C, the rotation of the motor 630 is transmitted to the rotating shaft 615 by the belt 620 disposed outside the housing 400. In the structure shown in FIG. 4C, it is possible to further suppress the influence of the heat generated by the motor 630 on the temperature in the housing 400 since the motor 630 can be further separated from the housing 400 than in the structure shown in FIG. 4B. Note that, as shown in FIG. 4D, the temperature adjustment device 420 may be provided on the side of the tank body 401. In this case, the distance is reduced from the fan 423 adjacent to the temperature adjustment device 420 to the outside of the apparatus body 200, so that the duct 425 can be rendered unnecessary or the duct 425 can be smaller.

Returning to FIG. 1A, the pretreatment apparatus 100 includes a controller 300. The controller 300 controls each part of the pretreatment apparatus body 200. The controller 300 is configured by a computer having a processor 330, and a storage 340. The processor of the controller 300 controls each part of the pretreatment apparatus 200 by executing a computer program for the control of pretreatment. The computer program is stored in the storage 340.

The controller 300 controls, for example, the movement of the dispenser 210 and suction and discharge of liquid such as reagent by the nozzle 211. The suction and discharge of the liquid by the nozzle 211 is also performed for mixing the liquid in the container 10. The suction of the liquid by the nozzle 211 is also performed for removing the supernatant in the container 10. The controller 300 also controls the temperature adjustment devices 221 and 231 of the reagent installing parts 220 and 230, thereby adjusting the temperature inside the reagent installing parts 220 and 230. The controller 300 comprehends the temperature inside the reagent installing parts 220 and 230 based on detection signals of temperature sensors (not shown) installed in the reagent installing parts 220 and 230. The controller 300 causes the external treatment part 270 to perform the mixing step and the supernatant removal step by controlling the external treatment part 270 as necessary.

The controller 300 of the embodiment controls opening and closing of the entry port 432 by controlling the drive part 451 of the operating device 450. The controller 300 controls the motor 630 to cause the centrifugal separation device 600 to perform a centrifugal separation step.

Figure 1B:
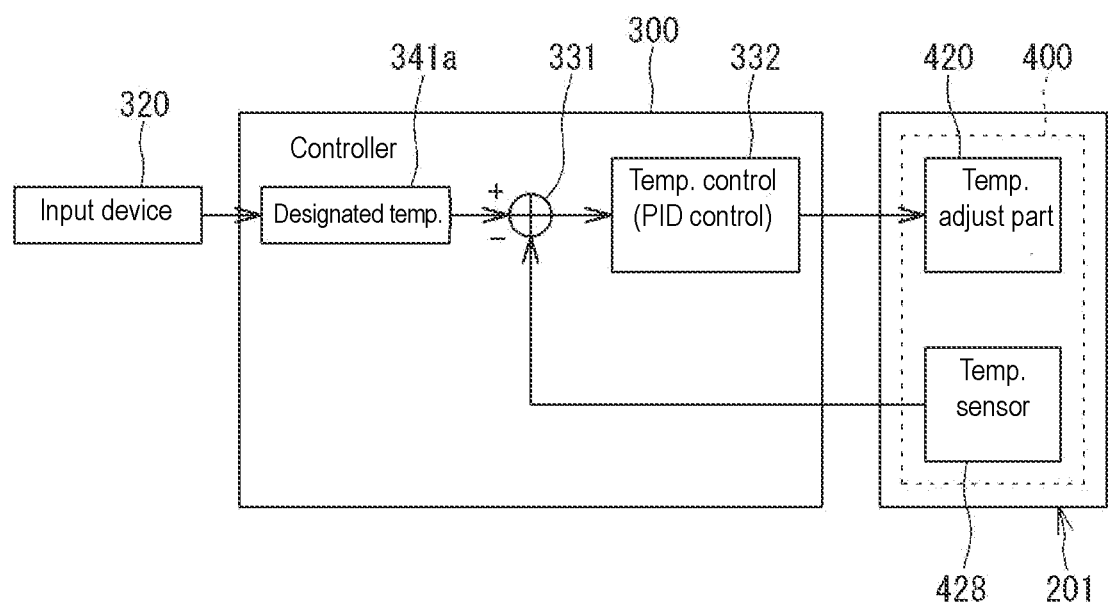
FIG. 1B is a block diagram for temperature control by a controller.

The controller 300 controls the temperature adjustment device 420 to adjust the temperature of the housing 400. Temperature adjustment includes warming and cooling. As shown in FIG. 1B, the controller 300 comprehends the temperature inside the housing 400 configuring the pretreatment device 201 based on the detection signal of the temperature sensor 428 installed in the housing 400 of the pretreatment device 201. The temperature detected by the temperature sensor 482 is fed back to the controller 300. The controller 300 obtains the difference between the designated temperature 341a stored in the storage 340 and the feedback temperature by the calculator 331 and performs temperature control by the temperature controller 332 so as to minimize the difference. The temperature control here is, for example, a PDI control. The temperature controller 332 outputs a command value to the temperature adjustment device 420, and controls the temperature controller 420 so that the temperature detected by the temperature sensor 482 becomes the set temperature 341a. The designated temperature 341a is stored in the storage 340 of the controller 300 by user input. The setting of the designated temperature 341a will be described later.

The controller 300 can perform controls to switch the temperature in the housing 400 during pretreatment. By controlling the fans 421 and 422, the controller 300 can control the convection of the housing 400. When the entry port 432 is open, the controller 300 performs controls to reduce the convection by stopping the second fan 422 or the like. The controller 300 controls the fan 433 to release the cold waste heat or warm exhaust heat generated by the temperature adjustment device 420 to the apparatus body 200.

The controller 300 is connected with a display 310 for displaying a control screen for pretreatment, and an input device 320 for receiving input from the user. For example, the controller 300 causes the display 310 to display the control screen 800 shown in FIG. 5A.

By operating the screen 800 on the input device 320, the user of the pretreatment apparatus 100 can select one mode out of a plurality of treatment modes preset in the controller 300, and operate the apparatus body 200. The user also can comprehend the operational state of the apparatus body 200 via the screen 800.

The screen 800 includes a treatment mode selection area 810. The selection area 810 is a selection screen for selecting a mode. Operational conditions of pretreatment executed in the apparatus body 200 are defined in the operating mode. As shown in FIG. 1A, a plurality of setting files 341, 342, and 343 are stored in the storage 340 of the controller 340. Treatment modes defining operation items indicating a plurality of treatments included in pretreatment and operational conditions of each operation item are set in each of the setting files 341, 342, and 343. In the storage 34, the setting file 341 stores a plurality of setting files 341, 342, and 343 are stored in the setting file 341 corresponding to a plurality of processing modes executable by the pretreatment apparatus. Designated temperature information 341a, 341b, 341c indicating a designated temperature in each treatment mode are included in the setting files 341, 342, 343. One setting file can contain a multiplicity of specified temperature information. The designated temperature is designated by user input via the input device 320.

Figure 5A:
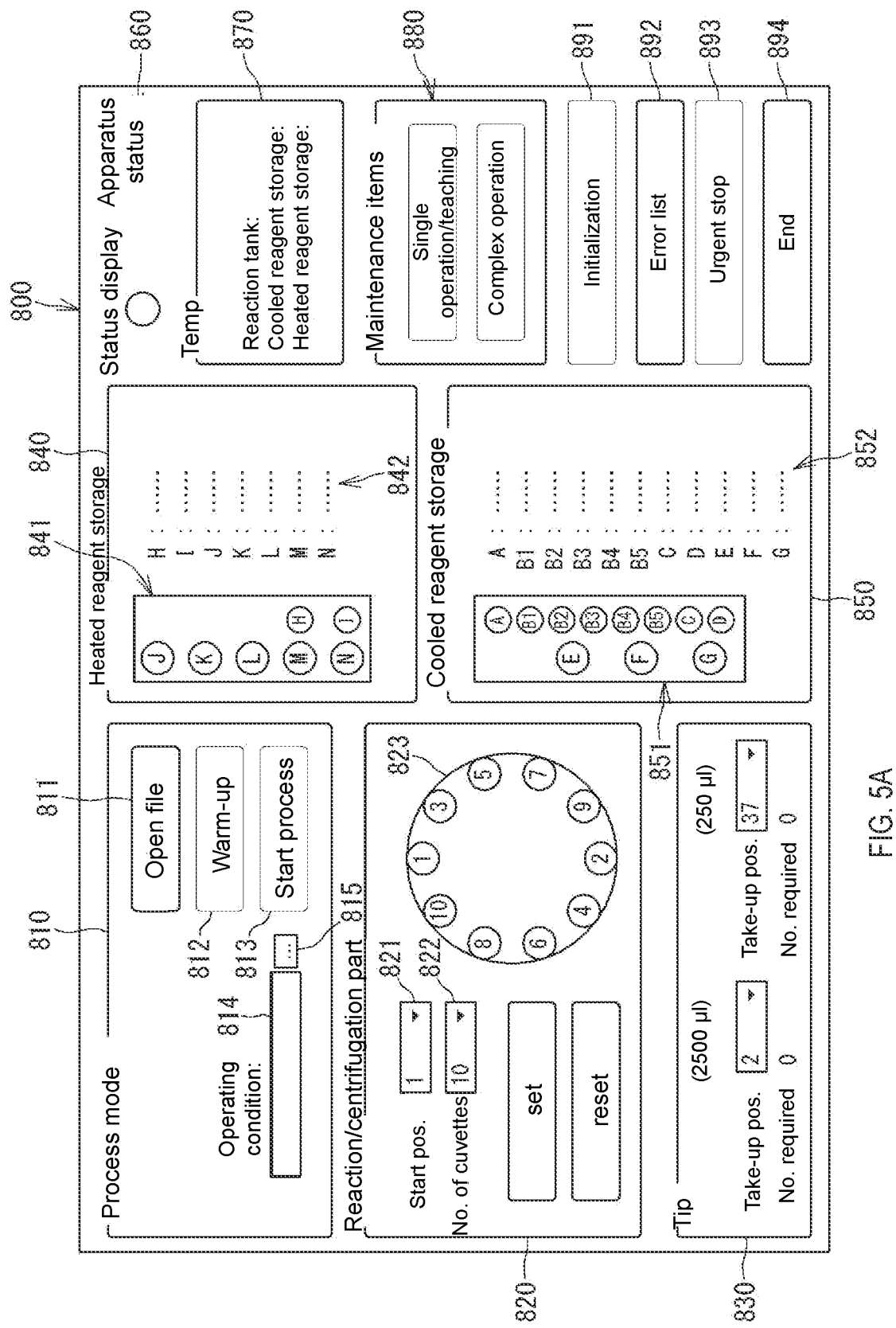
FIG. 5A is a diagram of a control screen.
Figure 5B:
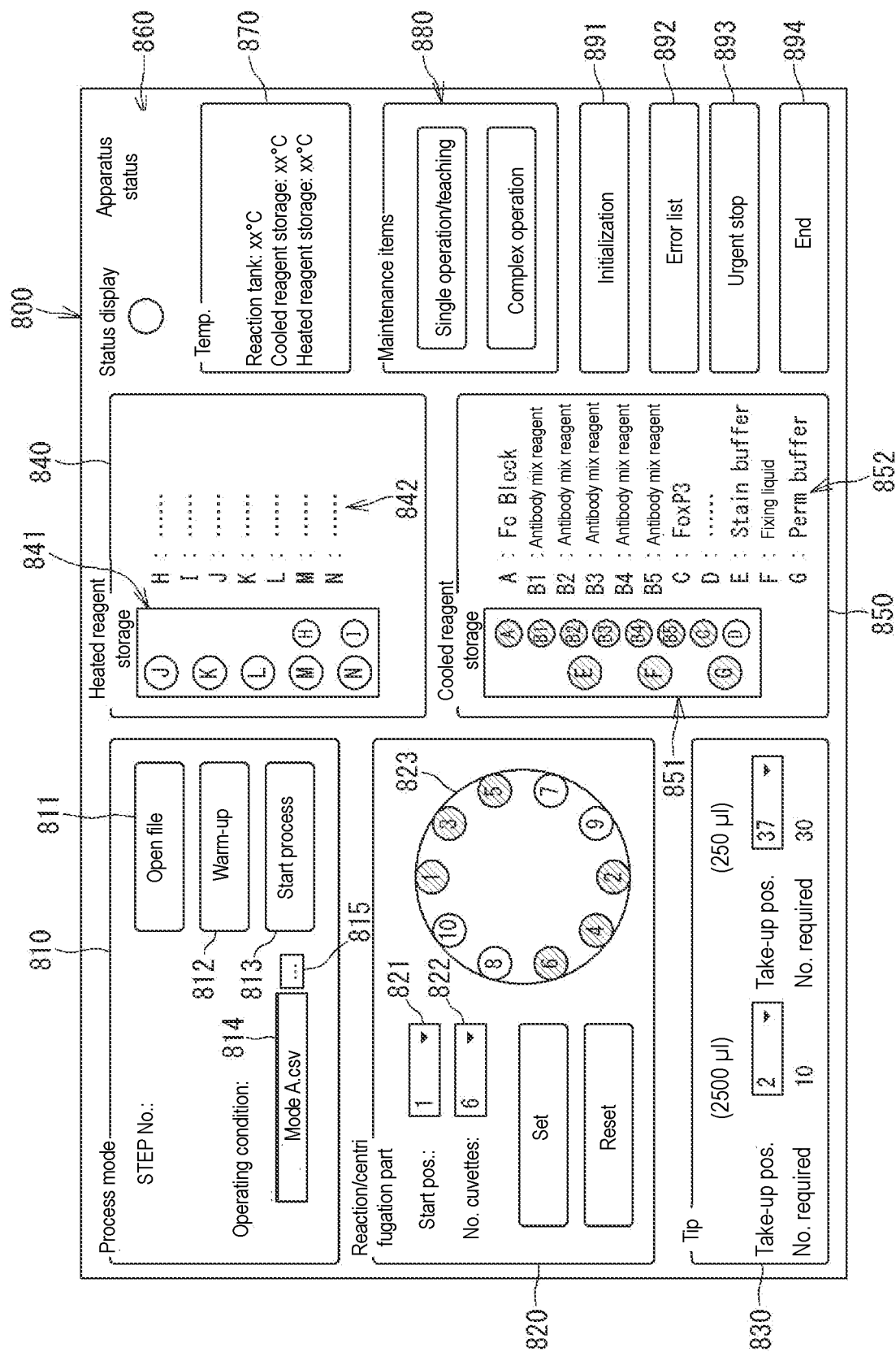
FIG. 5B is a diagram of a control screen.
Figure 6:
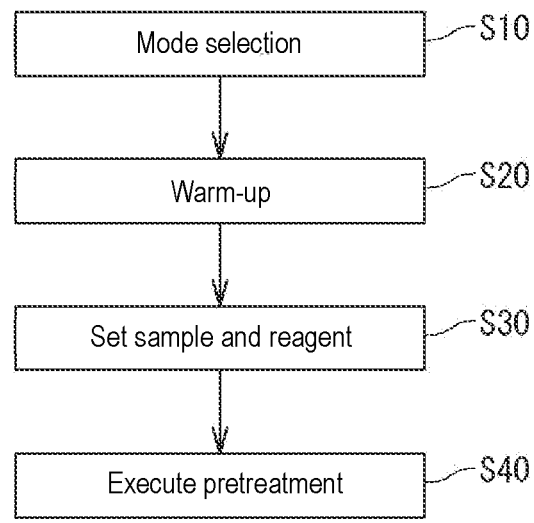
FIG. 6 is a flowchart showing a procedure for starting pretreatment.

According to the procedure shown in FIG. 6, the user can operate the screen 800 to execute pretreatment. In step S10 of FIG. 6, the user selects the "Open file" button 811 in FIG. 5A, and selects a setting file stipulating operation items and operating conditions of the treatment mode of a pretreatment desired to be executed from among one or more setting files 341 stored in the storage 340. For example, when the setting file "mode A.csv" is selected by the user, the "mode A.csv" is displayed on the display 814 as the setting file 341 selected by the user, as shown in FIG. 5B.

Here, since the way in which the analysis sample is to be prepared varies depending on the analysis item, the treatment necessary for the pretreatment differs depending on the analysis item of the sample. When the analysis item is surface antigen analysis of leukocytes, pretreatment of a sample suitable for surface antigen analysis of leukocytes is required. When the analysis item is flow cytometry FISH (fluorescence in situ hybridization) analysis, pretreatment of a sample suitable for flow cytometry FISH is required. Treatment modes of pretreatment according to the analysis item are defined in the setting files 341. The user selects a setting file 341 in which a treatment mode corresponding to an analysis item is specified from a plurality of setting files corresponding to a plurality of treatment modes. For example, when the analysis item is controllable T cell (Treg cell) analysis, the user selects the setting file 341 in which the treatment mode for Treg cell analysis is specified. When the analysis item is surface antigen analysis of white blood cells, the user selects a setting file 341 in which a treatment mode for surface antigen analysis of white blood cells is defined. When the analysis item is flow cytometry FISH analysis, the user selects the setting file 341 in which the treatment mode for flow cytometry FISH analysis is defined.

A "warm-up" button 812 is provided in the selection area 810. The "warm-up" button 812 can be selected when the setting file 341 is selected by the user. In step S20, when the user selects the "warm-up" button 812, the controller 300 causes the apparatus body 200 to start the warm-up for starting pretreatment. At this time, the apparatus status display 860 on the screen 800 of FIG. 5B indicates that the apparatus is in the warming-up state.

In the embodiment, during the warm-up, the internal temperature of each of the housings (reaction tanks) 400, the first reagent installing part (cooled reagent storage) 220, and the second reagent installing part (heated reagent storage) 230 is adjusted to a designated temperature set in advance.

During warm-up, the temperature of the reaction tank 400 is adjusted to the temperature at the start in the selected treatment mode. The starting temperature is, for example, 4° C., room temperature, or 70° C. During warm-up, the temperature of the cooled reagent storage 220 is adjusted to 4° C., for example. During warm-up, the temperature of the heated reagent storage 230 is adjusted to, for example, room temperature or 70° C. Note that the room temperature may be a temperature obtained by not adjusting the temperature, or may be a temperature obtained by adjusting the temperature to about 30° C.

In the screen 800 of FIG. 5B, the internal temperatures of the housing (reaction tank) 400, the first reagent installing part (cooled reagent storage) 220, and the second reagent installing part (heated reagent storage) 230 respectively correspond to the temperature display area 870.

When the warm-up is completed, the "start treatment" button 813 in the area 810 becomes selectable. When the warming-up is completed, the controller 300 performs a display prompting to set the sample and the reagent in the pretreatment apparatus body 200. In step S30 of FIG. 6, the user refers to the "reaction centrifuge part" area 820, the "heated reagent storage" area 840, and the "cooled reagent storage" area 850 displayed on the screen 500 of FIG. 5B, then the sample and the reagent are set in the apparatus body 200.

The "reaction centrifuge part" area 820 shows in which holder 610 among the plurality of holders 610 in the reaction tank 400 the container 10 should be set in the selected treatment mode. The "reaction centrifuge" area 820 of FIG. 5B, for example, indicates that six containers 10 are set in the holders 610 labeled by the numerals of "1", "2", "3", "4", "5" and "6" on the rotor 613. In FIG. 5B, "Start Pos." 821 indicates, for example, that six containers are to be set from the position of numeral "1", and "Number of cuvettes" indicates, for example, that six containers 10 to be set. In the "reaction centrifuge part" area 820, a FIG. 823 indicating the position of the holder 10 where the container 10 is to be installed is displayed. The figure in the FIG. 823 corresponds to the number attached to the rotor 613. Therefore, the user can easily set the container 10 at the correct position. The numerals with hatching in FIG. 823 indicate the positions where the container 10 is to be set.

The "cooled reagent storage" area 850 shows what kind of reagent should be set at which position in the first reagent installing part (cooled reagent storage) 220 in the selected treatment mode. The FIG. 851 in the "cooled reagent storage" area 850 of FIG. 5B shows eleven reagent container setting positions A, B1, B2, B3, B4, B5, C, D, E, F, and G. As an example, in FIG. 5B, the positions of "A", "B1", "B2", "B3", "B4", "B5", "C", "E", "F", and "G", which are shaded in the FIG. 851, indicate the positions at which the reagent container 225 are installed, and the reagent name display 852 in FIG. 5 shows the name of the reagent installed at the shaded position. The reagent container installing position indicated by A to G in the FIG. 851 in FIG. 5 corresponds to the installing position of the reagent container 225 in the first reagent installing part 220, and the user can easily set the reagent container 225 at the correct position of the first reagent installing part 220.

Note that, hereinafter, the reagent container installed at position A is referred to as A reagent container, the reagent container installed at positions B1 to B5 are referred to as B1 to B5 reagent container, the reagent container installed at position C is referred to as C reagent container, the reagent container installed at the position D is the D reagent container, the reagent container installed at position E is the E reagent container, and the reagent container installed at the position F is the F reagent container.

The "heated reagent storage" area 840 indicates what kind of reagent should be set at which position of the second reagent installing part (heated reagent storage) 230 in the selected treatment mode. The FIG. 841 in the "heated reagent storage" area 840 of FIG. 5B shows seven reagent container setting positions of H, I, J, K, L, M, and N. As an example, FIG. 5B shows that no reagent is installed in the second reagent installing part 230. The reagent container setting positions indicated by H to N in the FIG. 841 in FIG. 5B correspond to the installation position of the reagent container 235 in the second reagent installing part 230, and the user can easily set the reagent container 235 at the correct position of the second reagent installing part 230.

Note that in the following description the reagent container installed at the position of H is the H reagent container, the reagent container installed at the position I is the I reagent container, the reagent container installed at the position J is the J reagent container, the reagent container installed at the position K is the K reagent container, the reagent container installed at the position L is the L reagent container, a reagent container installed at the position of M is an M reagent container, and a reagent container installed at the position of N is an N reagent container.

A "tip" area 830 is also displayed on the screen 800 of FIG. 5B. The "tip" area 830 shows how many pipette tips 212 installed in the tip setting parts 240 and 250 are used in the pretreatment of the selected treatment mode. By referring to the "tip" area 830, the user can confirm whether the necessary number of pipette tips 212 are installed in the tip setting parts 240 and 250.

Upon completion of the setting of the containers 10 containing the sample and the reagent containers 225 and 235, the user selects the "start treatment" button 813 of the screen 800 in step S40 of FIG. 6. When the "treatment start" button 814 is selected, the controller 300 controls each part of the apparatus body 200 according to the operation items and operating conditions prescribed in the selected setting file 341, and processes the sample in the container 10.

Figure 7:
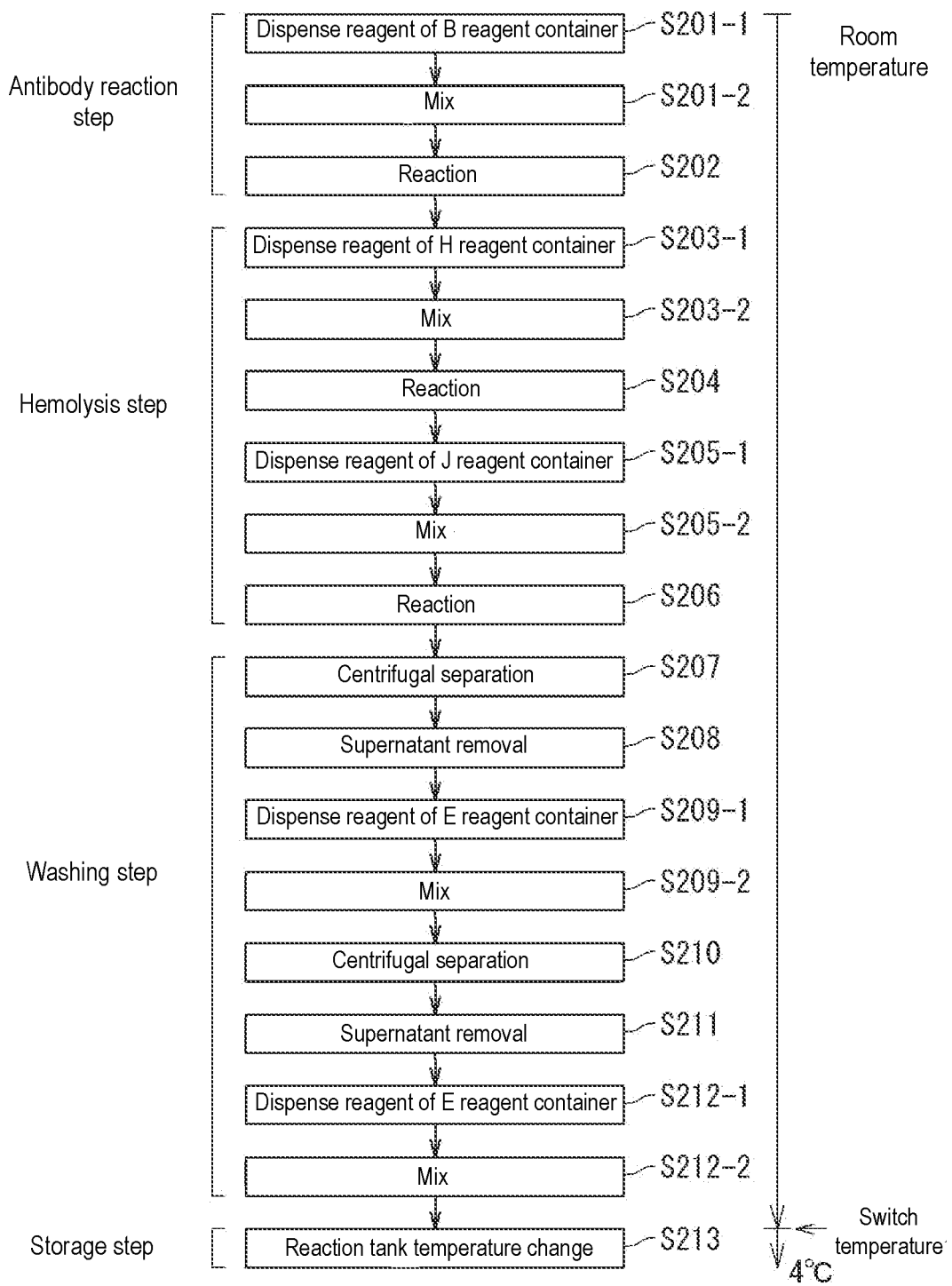
FIG. 7 is a flowchart showing an operational procedure for pretreatment.

FIG. 7 shows the operation procedure of pretreatment for surface antigen analysis of white blood cells. The controller 300 executes the procedure shown in FIG. 7 in accordance with the operation items and operation conditions prescribed in the pretreatment setting file 341 for surface antigen analysis of white blood cells.

In the warm-up in step S20 performed prior to the pretreatment shown in FIG. 7, the temperature of the reaction tank 400 is set to the room temperature which is the temperature at the start of the pretreatment. The temperature of the first reagent installing part (cooled reagent storage) 220 is set to 4° C. The temperature of the second reagent installing part (heated reagent storage) 230 is set to room temperature. The room temperature here is the temperature obtained by temperature non-adjustment.

In FIG. 7, the temperature of the reaction tank 400 in steps S201-1 to S212-2 is room temperature. Room temperature is a temperature suitable for the reaction and the like in FIG. 7. In step S213, the ambient temperature in the reaction tank 400 is switched to a low temperature (4° C.) suitable for storage of the sample. In this way, the temperature in the reaction tank 400 can be adjusted to a temperature desired for each step by switching the temperature.

Each step shown in FIG. 7 will be described in detail below. First, the controller 300 executes an antibody reaction step. The antibody reaction step is a step of staining a cell surface by reacting a cell surface antigen with an antibody reagent. In the antibody reaction step, a plurality of types of antibody reagents are used. The antibody reaction step includes steps S201-1, S201-2, and S102.

In the dispensing step of step S201-1, a predetermined amount of the antibody reagent in the B1 reagent container installed in the cooled reagent storage 220 is suctioned by the nozzle 211, and a predetermined amount of the antibody reagent is dispensed to the container 10 in the reaction tank 400. The antibody reagents in the B2 to B5 reagent containers are similarly dispensed into the container 10. In the agitation step of step S201-2, the dispensed reagents and sample are mixed by the suction and discharge operation of the nozzle 211. In the reaction step of step S2002, the reaction between the reagents and the sample is performed for a predetermined time.

A hemolysis step is performed following the antibody reaction step. The hemolysis step includes steps S203-1 to S206. In the dispensing step of step S203-1, a predetermined amount of hemolytic agent (see FIG. 8) in the H reagent container installed in the heated reagent storage 230 is suctioned by the nozzle 211 and a predetermined amount of hemolytic agent is dispensed into the mixture in the container 10 in the reaction tank 400. In the mixing step of step S203-2, the dispensed hemolytic agent and the sample are mixed by the suction and discharge operation of the nozzle 211. In the reaction step of step S204, the reaction between the hemolytic agent and the sample is performed for a predetermined time.

In the dispensing step of step S205-1, a predetermined amount of hemolytic agent (see FIG. 8) in the J reagent container installed in the heated reagent storage 230 is suctioned by the nozzle 211 and a predetermined amount of the hemolytic agent is dispensed into the mixture in the container 10 in the reaction tank 400. In the mixing step of step S205-2, the dispensed hemolytic agent and the sample are mixed by the suction and discharge operation of the nozzle 211. In the reaction step of step S206, the reaction between the hemolytic agent and the sample is performed for a predetermined time.

Following the hemolysis step, a washing step is performed. The washing step includes steps S207 to S212-2. In step S207, the centrifugal separation step is performed by the centrifugal separation device 600. In the supernatant removal step of step S208, the supernatant of the container 10 is removed by suction of the nozzle 211.

In the dispensing step of step S209-1, a predetermined amount of washing liquid in the E reagent container installed in the cooled reagent storage 220 is suctioned by the nozzle 211, and a predetermined amount of washing liquid is dispensed into the container 10 in the reaction tank 400. The washing liquid here is phosphate buffered saline (PBS) (see FIG. 8). In the mixing step of step S209-2, the dispensed washing liquid and the sample are mixed by the suction and discharge operation of the nozzle 211. In step S210, the centrifugal separation process is performed by the centrifugal separation device 600. In the supernatant removal step of step S211, the supernatant of the container 10 is removed by suction of the nozzle 211. In steps S212-1 to S212-2, the same processing as step S120 to step S12 is repeated. In this way a sample for analysis is prepared.

Following the washing step, the storage step of step S213 is executed. The storage step is a temperature change step. In step S213, the controller 300 changes the ambient temperature in the reaction tank 400 to a low temperature (4° C.) suitable for storage of the sample. The controller 300 determines the switching of the ambient temperature in the reaction tank 400 based on the detection result of the temperature sensor 428. In the storage step, the sample is stored at a low temperature suitable for storage until it is analyzed.

FIG. 9A, FIG. 9B, FIG. 10A and FIG. 10B show the operation procedure of pretreatment for FISH analysis. Pretreatment for FISH analysis requires intracellular staining in addition to cell surface staining of cells contained in the sample. The controller 300 executes the procedures shown in FIG. 9A, FIG. 9B, FIG. 10A, and FIG. 10B according to the operation items and operation conditions defined in the pretreatment setting file 341 for FISH analysis. Here, the pretreatment for FISH analysis includes hybridization, but in an embodiment, the hybridization is performed in another apparatus for hybridization. In the embodiment, the processing executed by the pretreatment apparatus 100 is the procedure before hybridization shown in FIGS. 9A and 9B and the hybridization procedure shown in FIGS. 10A and 10B. Note that hybridization also may be performed in the pretreatment apparatus 100.

Figure 9A:
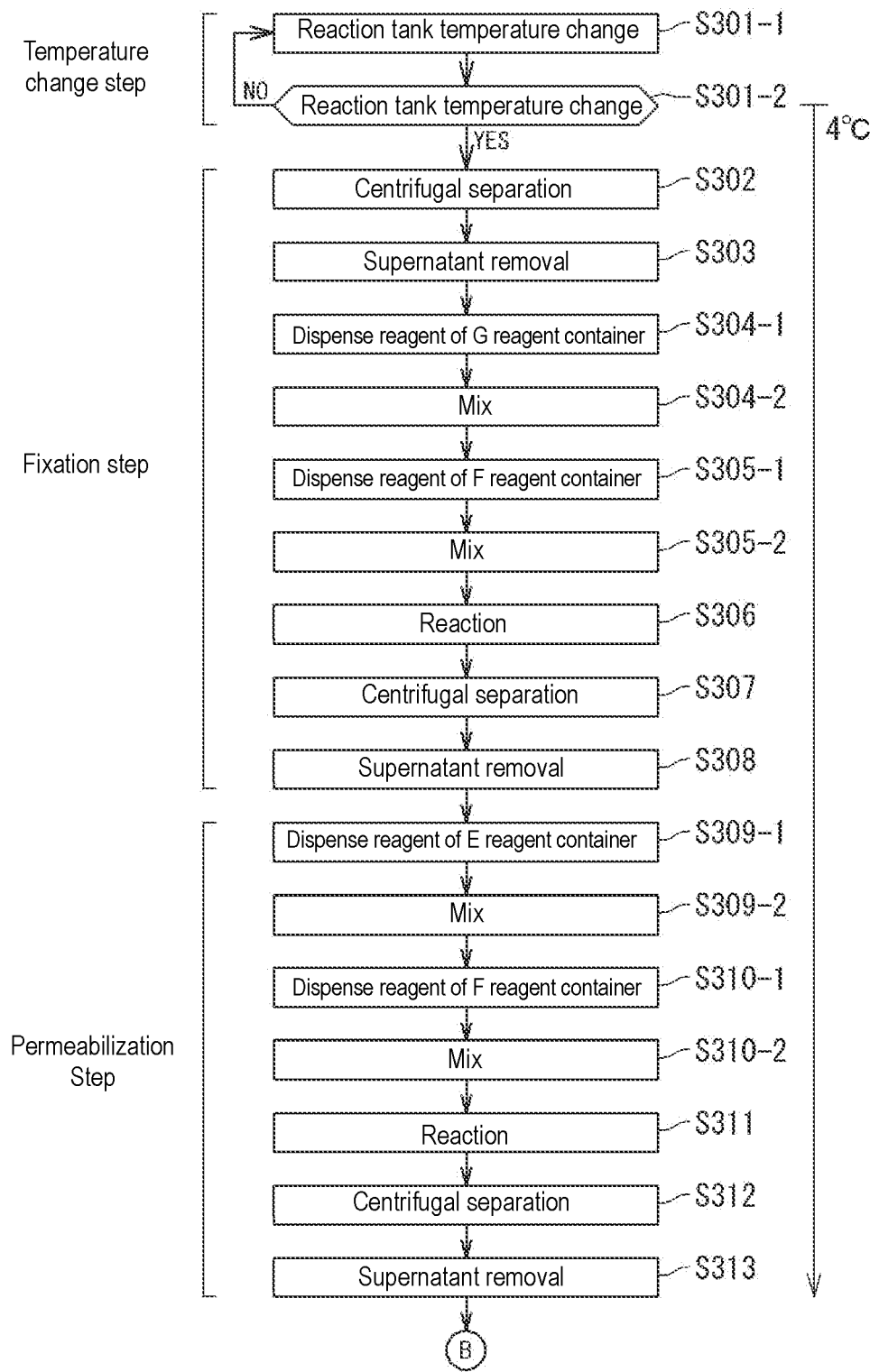
FIG. 9A is a flowchart showing an operational procedure for pretreatment.
Figure 9B:
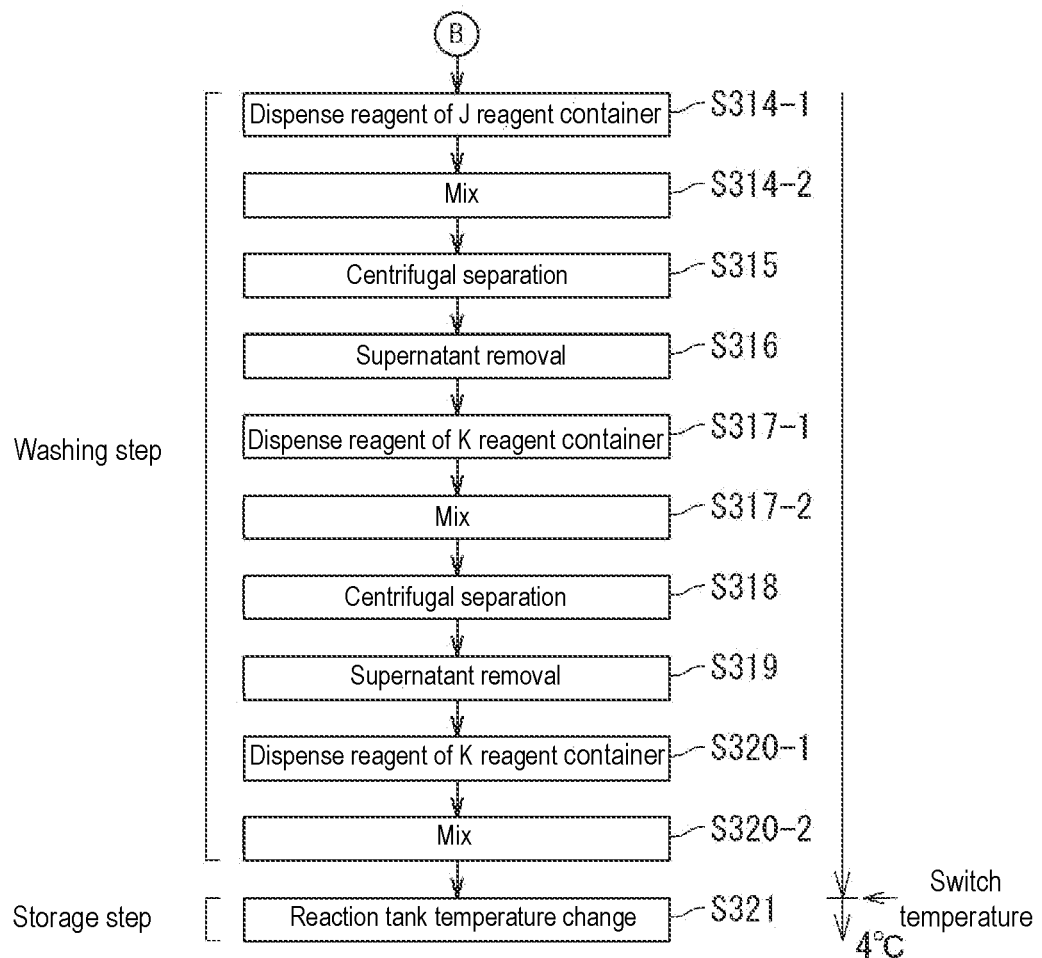
FIG. 9B is a flowchart showing an operation procedure of pretreatment.

In the warm-up in step S20 performed prior to the pretreatment shown in FIGS. 9A and 9B, the ambient temperature in the reaction tank 400 is set to 4° C. which is the temperature at the start of the process, and the temperature of the first reagent installing part (cooled reagent storage) 220 is also set at 4° C. During the pretreatment, the controller 300 keeps the temperature of the first reagent installing part (cooled reagent storage) 220 at 4° C. The temperature of the second reagent installing part (heated reagent storage) 230 is set to room temperature. The room temperature here is the temperature obtained by temperature non-adjustment.

In FIGS. 9A and 9B, the temperature of the reaction tank 400 is 4° C. in steps S301 to S321. The 4° C. temperature is suitable for cell fixation, membrane permeation, and sample storage.

Each step shown in FIG. 9A and FIG. 9B will be described in detail below. In steps S301-1 and S301-2 immediately after the start of the pretreatment execution, a temperature changing step of the reaction tank 400 is performed to adjust the ambient temperature in the reaction tank 400 to 4° C. The temperature in the reaction tank 400 is temporarily adjusted to 4° C. in the warm-up before the pretreatment is executed, but the temperature in the reaction tank 400 may increase by opening the lid 430 in order to set the container 10 containing the sample in the reaction tank 400. Therefore, in step S301, the controller 300 adjusts the temperature until the ambient temperature in the reaction tank 400 reaches 4° C. In step S301-2, the controller 300 determines that the ambient temperature in the reaction tank 400 has reached 4° C. based on the detection result of the temperature sensor 428.

When the temperature of the reaction tank 400 is adjusted to 4° C., the controller 300 executes a cell fixing step. The fixation processing step includes steps S302 to S308. In the centrifugal separation step S302, a centrifugal separation step is performed by the centrifugal separation device 600. In the supernatant removal step of step S303, the supernatant of the container 10 is removed by suction of the nozzle 211.

In the dispensing step of step S304-1, a predetermined amount of the reagent in the E reagent container installed in the cooled reagent storage 220 is suctioned by the nozzle 211, and a predetermined amount of reagent is dispensed into the container 10 in the reaction tank 400. The reagent here is phosphate buffered saline (PBS) (see FIG. 9C). In the mixing step of step S304-2, the dispensed reagent and sample are mixed by the suction and discharge operation of the nozzle 211.

In the dispensing step of step S305-1, a predetermined amount of reagent in the F reagent container installed in the cooled reagent storage 220 is suctioned by the nozzle 211, and a predetermined amount of reagent is dispensed into the container 10 in the reaction tank 400. The reagent here is methanol/acetic acid/PBS (see FIG. 9C). In the mixing step of step S305-2, the dispensed reagent and sample are mixed by the suction and discharge operation of the nozzle 211.

In the reaction step of step S306, the reaction between the reagents and the sample is performed for a predetermined time. In step S307, the centrifugal separation step is performed by the centrifugal separation device 600. In the supernatant removal step of step S308, the supernatant of the container 10 is removed by suction of the nozzle 211.

Following the fixation process step, the cell permeabilization process step is performed. The fixation process step includes steps S309 to S313.

In the dispensing step of step S309-1, a predetermined amount of the reagent in the E reagent container installed in the cooled reagent storage 220 is suctioned by the nozzle 211, and a predetermined amount of reagent is dispensed into the container 10 in the reaction tank 400. The reagent here is phosphate buffered saline (PBS) (see FIG. 9C). In the mixing step of step S309-2, the dispensed reagent and sample are mixed by the suction and discharge operation of the nozzle 211.

In the dispensing step of step S310-1, a predetermined amount of reagent in the F reagent container installed in the cooled reagent storage 220 is suctioned by the nozzle 211, and a predetermined amount of reagent is dispensed into the container 10 in the reaction tank 400. The reagent here is methanol/acetic acid/PBS (see FIG. 9C). In the mixing step of step S310-2, the dispensed reagent and sample are mixed by the suction and discharge operation of the nozzle 211.

In the reaction step of step S311, the reaction between the reagents and the sample is performed for a predetermined time. In step S312, the centrifugal separation step is performed by the centrifugal separation device 600. In the supernatant removal step of step S313, the supernatant of the container 10 is removed by suction of the nozzle 211.

A washing step is performed following the membrane permeation treatment step. The washing step includes steps S314-1 to S320-2.

In the dispensing step of step S314-1, a predetermined amount of reaction buffer (see FIG. 9C) in the J reagent container installed in the heated reagent storage 230 is suctioned by the nozzle 211, and a predetermined amount of reaction buffer is dispensed into the container 10 in the reaction tank 400. In the mixing step of step S314-2, the dispensed reaction buffer and sample are mixed by the suction and discharge operation of the nozzle 211.

In step S315, the centrifugal separation step is performed by the centrifugal separation device 600. In the supernatant removal step of step S3316, the supernatant of the container 10 is removed by suction of the nozzle 211.

In the dispensing step of step S317-1, a predetermined amount of buffer in the K reagent container installed in the heated reagent storage 230 is suctioned by the nozzle 211, and a predetermined amount of buffer is dispensed into the container 10 in the reaction tank 400. The buffer here is 2× Saline Sodium Citrate Buffer (SSC) (see FIG. 9C). In the mixing step of step S317-2, the dispensed buffer and sample are mixed by the suction and discharge operation of the nozzle 211.

In step S318, the centrifugal separation step is performed by the centrifugal separation device 600. In the supernatant removal step of step S3319, the supernatant of the container 10 is removed by suction of the nozzle 211.

In the dispensing step of step S320-1, a predetermined amount of buffer in the K reagent container installed in the heated reagent storage 230 is suctioned by the nozzle 211, and a predetermined amount of buffer is dispensed into the container 10 in the reaction tank 400. The buffer here is 2× Saline Sodium Citrate Buffer (SSC). In the mixing step of step S320-2, the dispensed buffer and sample are mixed by the suction and discharge operation of the nozzle 211.

Following the washing step, the storage step of step S 321 is executed. The storage step is a temperature change step. In step S321, a temperature change step is executed in order to reliably set the ambient temperature in the reaction tank 400 to a low temperature (4° C.) suitable for storage of the sample prepared in the process up to step S320-2. The controller 300 determines the switching of the ambient temperature in the reaction tank 400 based on the detection result of the temperature sensor 428. In the storage step, the sample is stored at a low temperature suitable for storage until hybridization is performed.

Figure 10A:
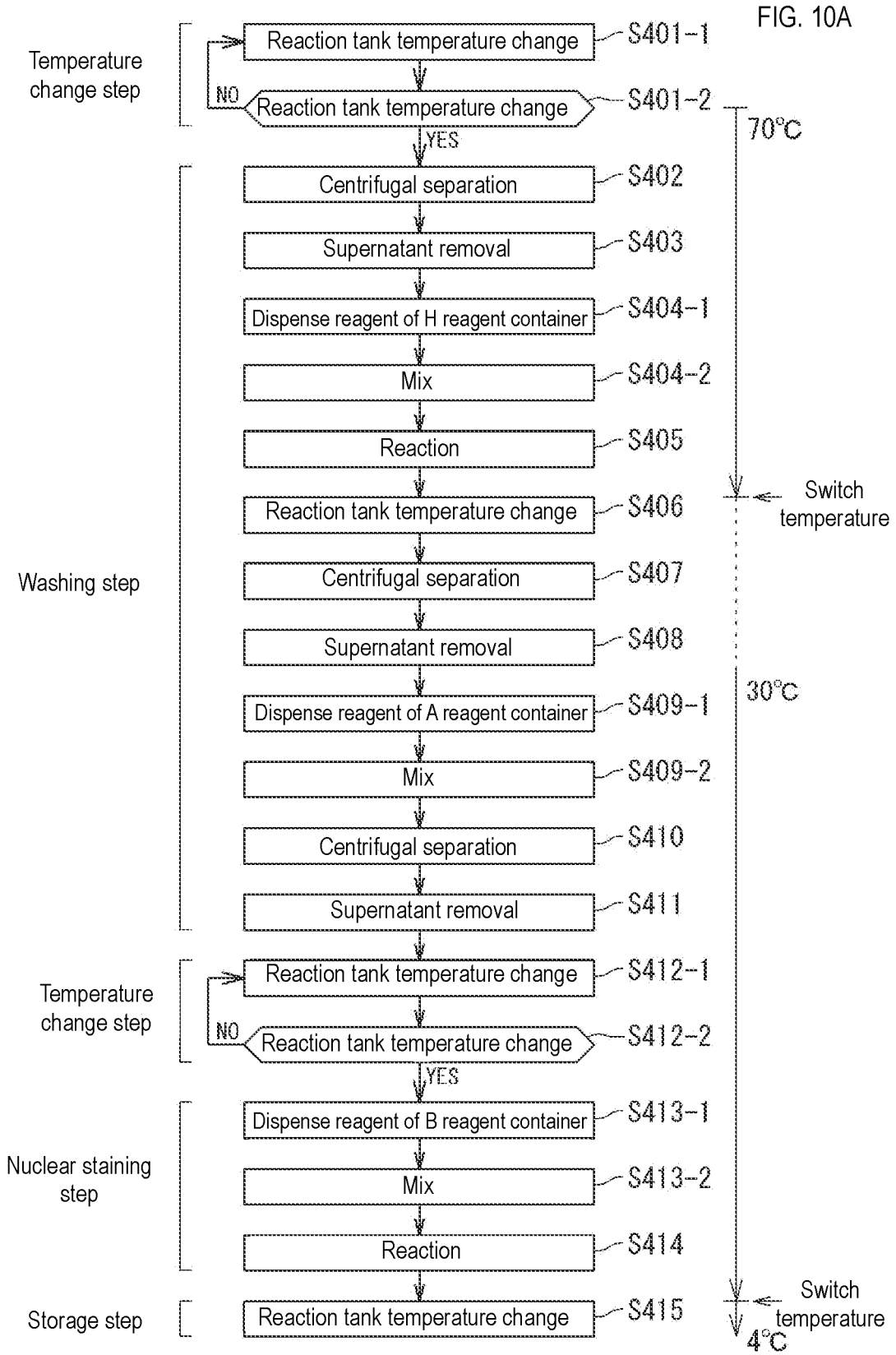
FIG. 10A is a flowchart showing an operational procedure for pretreatment.

After hybridization is performed with another apparatus, the procedure shown in FIG. 10A is executed. In the warm-up in step S20 performed prior to the treatment shown in FIG. 10A, the ambient temperature in the reaction tank 400 is set to 70° C. which is the temperature at the start of the treatment, and the temperature of the first reagent installing part (cooled reagent storage) 220 is set at room temperature. Note that room temperature here is 30° C. obtained by temperature adjustment. The temperature of the second reagent installing part 230 also is set to 70° C. which is the same as the temperature of the reaction tank 400.

In FIG. 10A, the ambient temperature in the reaction tank 400 is adjusted to 70° C. from step S402 to step S405, and the ambient temperature in the reaction tank 400 is adjusted to 30° C. (room temperature) from step S407 to step S414. In step S415, the ambient temperature in the reaction tank 400 is again switched to 4° C.

In the process of FIG. 10A, the ambient temperature in the reaction tank 400 from step S402 to step S405 is adjusted to 70° C. because it is preferable that the reaction step of step S405 of FIG. 10 is performed at 70° C. The ambient temperature in the reaction tank 400 in steps S407 to S414 is adjusted to 30° C. (room temperature) because these steps are preferably performed at room temperature (70° C. is too high). The ambient temperature in the housing 400 is adjusted to 4° C. in the storage step of step S415 in order to store the prepared sample at a low temperature until analysis.

In this way although the desired temperature changes in each step in the process of FIG. 10A, the temperature inside the reaction vessel 400 can be adjusted to the desired temperature for each process by switching the temperature.

Each step shown in FIG. 10A will be described in detail below. In steps S401-1 and S401-2 immediately after the start of the pretreatment execution, the temperature changing step of the reaction tank 400 is performed to adjust the ambient temperature in the reaction tank 400 to 70° C. In the warm-up before the pretreatment is carried out, the temperature in the reaction tank 400 is temporarily adjusted to 70° C., but thereafter the temperature in the reaction tank 400 sometimes drops. Therefore, in steps S401-1 and S401-2, the controller 300 adjusts the temperature until the ambient temperature in the reaction tank 400 reaches 70° C.

When the ambient temperature in the reaction tank 400 is adjusted to 70° C., the controller 300 executes a washing step. The washing step includes steps S402 to S411. In the centrifugal separation step S402, a centrifugal separation step is performed by the centrifugal separation device 600. In the supernatant removal step of step S403, the supernatant of the container 10 is removed by suction of the nozzle 211.

In the dispensing step of step S404-1, a predetermined amount of reagent in the H reagent container installed in the heated reagent storage 230 is suctioned by the nozzle 211, and a predetermined amount of reagent is dispensed into the container 10 in the reaction tank 400. The reagent here is 2× Saline Sodium Citrate Buffer (SSC) (see FIG. 10B). Since the reagent is warmed to the same 70° C. as that of the reaction tank 400 in the heated reagent storage 230, it is possible to prevent a temperature drop due to reagent dispensing. In the mixing step of step S404-2, the dispensed reagent and sample are mixed by the suction and discharge operation of the nozzle 211. In the reaction step of step S405, the reaction between the reagent and the sample is performed for a predetermined time at a preferable temperature of 70° C.

After the reaction step of step S405, the controller 300 changes the temperature of the reaction tank 400 to 30° C. in step S406. The controller 300 starts executing the next step S407 without waiting for the ambient temperature in the reaction tank 400 to reach 30° C. Since the temperature does not become a serious problem in the washing process, pretreatment time can be reduced by performing temperature change and washing in parallel.

In the centrifugal separation step in step S407, the centrifugal separation step is performed by the centrifugal separation section 600. In the supernatant removal step in step S408, the supernatant of the container 10 is removed by suction of the nozzle 211.

In the dispensing step of step S409-1, a predetermined amount of the buffer in the A reagent container installed in the cooled reagent storage 220 is suctioned by the nozzle 211, and a predetermined amount of reagent is dispensed into the container 10 in the reaction tank 400. The reagent here is TBST (see FIG. 10B). In the mixing step of step S409-2, the dispensed buffer and sample are mixed by the suction and discharge operation of the nozzle 211. In the centrifugal separation step S410, a centrifugal separation step is performed by the centrifugal separation device 600. In the supernatant removal step of step S411, the supernatant of the container 10 is removed by suction of the nozzle 211.

After completion of the washing step, the temperature changing step of steps S412-1, S412-2 is executed. The temperature changing step of steps S412-1 and S412-2 is to reliably bring the ambient temperature in the reaction tank 400 to 30° C. prior to the execution of the subsequent nuclear staining step. Although the ambient temperature in the reaction tank 400 drops to 30° C. during the washing step from step S407 to step S411 in conjunction with the temperature change by the temperature changing step in step S406, the apparatus waits until 30° C. is reached in the temperature change step of step S412 if 30° C. has not yet been attained.

The nuclear staining step is executed when the temperature of the reaction tank 400 reaches 30° C. The nuclear staining step is a step of staining nuclei in cells. The nuclear staining step includes steps S413-1, S413-2, and S414.

In the dispensing step of step S413-1, a predetermined amount of nuclear staining agent in the B reagent container installed in the cooled reagent storage 220 is suctioned by the nozzle 211, and a predetermined amount of nuclear staining agent is dispensed into the container 10 in the reaction tank 400. In the mixing step of step S413-2, the dispensed nuclear staining agent and the sample are mixed by the suction and discharge operation of the nozzle 211. In the reaction step of step S414, the nucleus of the cells contained in the sample is stained with the nuclear stain. A sample for FISH analysis is prepared by the above process.

The storage step of step S415 is executed following each staining step. The storage step is a temperature change step. In step S415, the controller 300 executes a temperature changing step in order to set the ambient temperature in the reaction tank 400 to a low temperature (4° C.) suitable for storage of a sample to be used for analysis. In the storage step, the sample is stored at a low temperature suitable for storage until analysis is performed.

According to the pretreatment apparatus 100 of the embodiment described above, even if a different temperature is desired in each process included in the pretreatment, it is possible to cope by switching the temperature. Although the pretreatment apparatus 100 can execute a plurality of types of pretreatment according to the analysis items, pretreatment can be performed at an appropriate temperature according to the type of pretreatment.

FIG. 11 to FIG. 15 show setting screens 900 for creating setting files of treatment modes according to analysis items. In the embodiment, when the setting button 815 on the screen 800 illustrated in FIGS. 5A and 5B is selected by the user, the controller 300 causes the display 310 to display the setting screen 900 illustrated in FIG. 11. The user can set the operation items of the pretreatment corresponding to the analysis items and the operation conditions of each operation item on the setting screen 900.

Figure 12A:
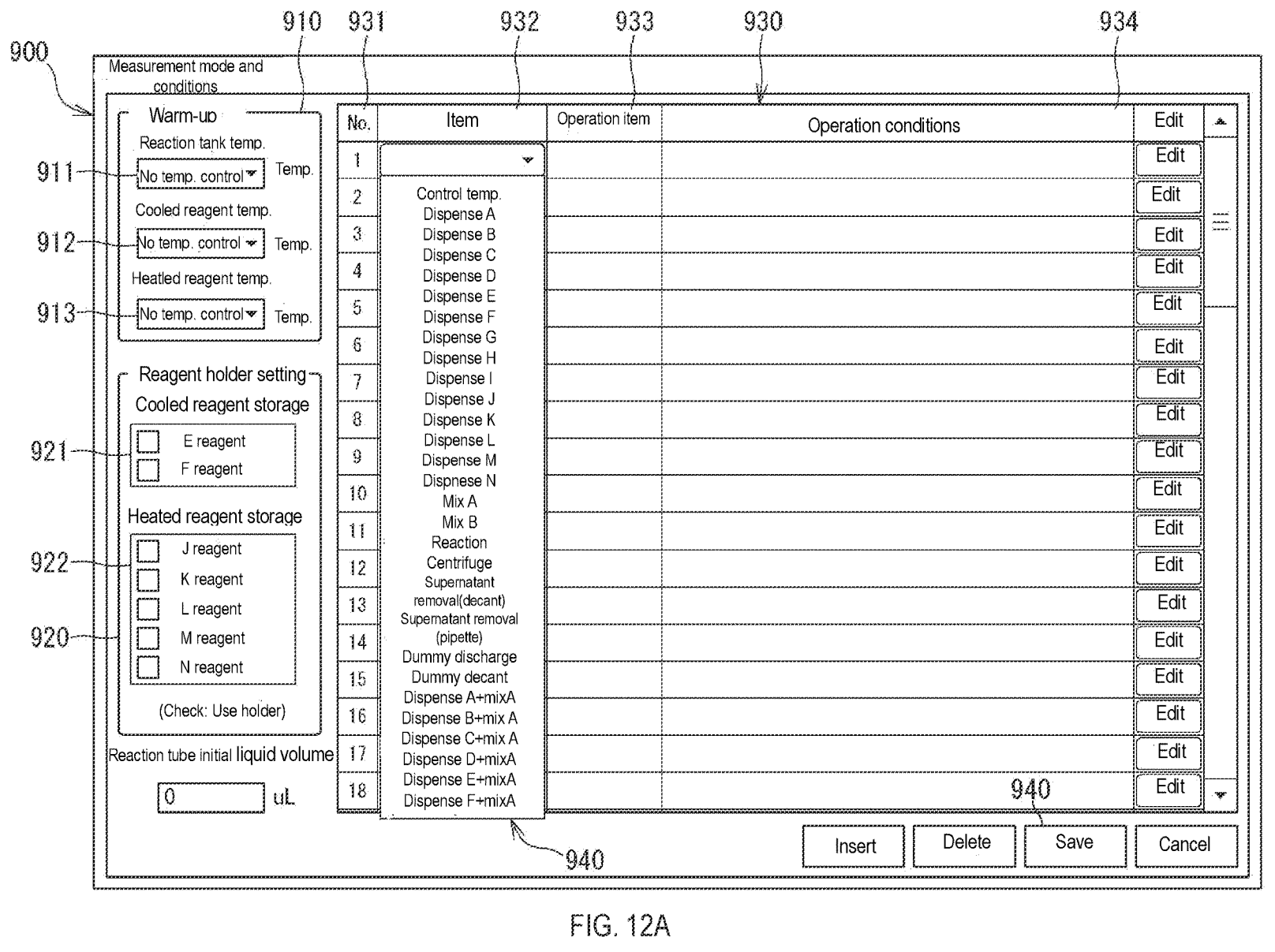
Figure 12B:
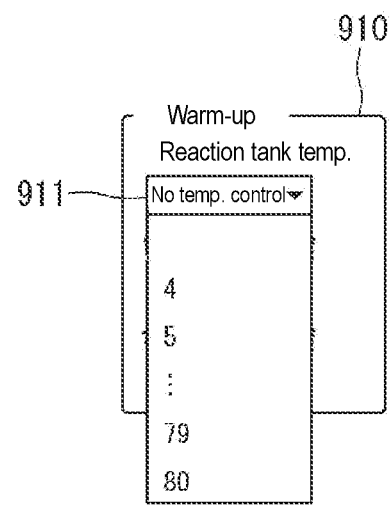
FIG. 12B is a diagram of a setting screen.
Figure 12C:
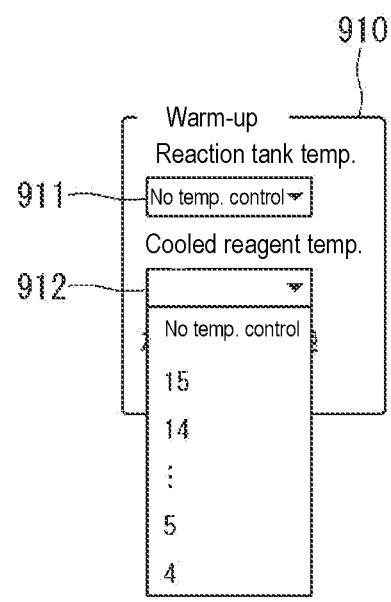
FIG. 12C is a diagram of a setting screen.
Figure 12D:
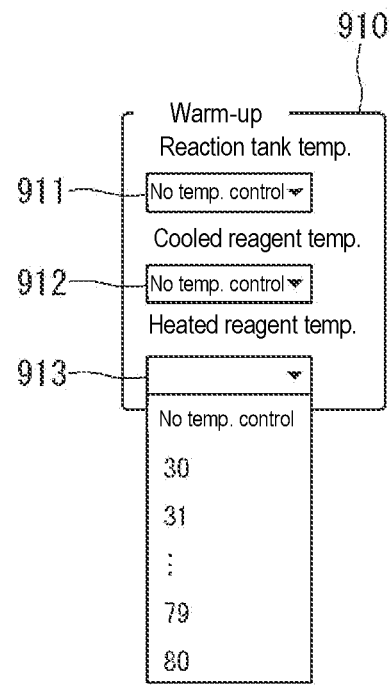
FIG. 12D is a diagram of a setting screen.

The setting screen 900 includes an area 910 for setting conditions for warming up. The area 910 is an area where the temperature setting part 911 of the housing (reaction tank) 400, the temperature setting part 912 of the first reagent installing part (cooled reagent storage) 220, the temperature setting part 913 of the second reagent installing part (heated reagent storage) 230 are provided. The designated temperatures set in the temperature setting parts 911, 912, and 913 are stored as designated temperature information 341a, 342a, and 343a in the storage 340. During warm-up, the housing 400, the first reagent installing part 220, and the second reagent installing part 230 are adjusted to the designated temperature set in the temperature setting parts 911 and 912. Note that the temperature setting parts 911, 912, and 913 are pull-down menus, and when selected, a list of temperature candidates to be set is displayed as shown in FIGS. 12B, 12C, and 12D. The list of temperature candidates includes not only temperature candidates but also "no temperature control" indicating that temperature adjustment is not performed. In the temperature setting parts 911, 912, and 913, the temperature can be specified numerically. Note that the designation of the temperature is not limited to the selection of the temperature candidates, and the input device 320 may directly accept a numerical value indicating a temperature.

The setting screen 900 includes a setting area 920 of a reagent bottle holder. The reagent bottle holder is a holder used for installing a reagent container smaller than a standard size reagent container installed in the reagent setting parts 220 and 230. In the setting area 920, whether a holder is used can be set when installing the reagent container. In the cooled reagent storage area 921 in the area 920, it is possible to set whether to use a holder for the E reagent container and the F reagent container in the first reagent installing part (cooled reagent storage) 220. In the heated reagent storage area 922 in the area 920, whether to use a holder can be set with respect to the J reagent container, the K reagent container, the L reagent container, the M reagent container, and the N reagent container in the second reagent installing part (heated reagent storage) 230.

Figure 11:
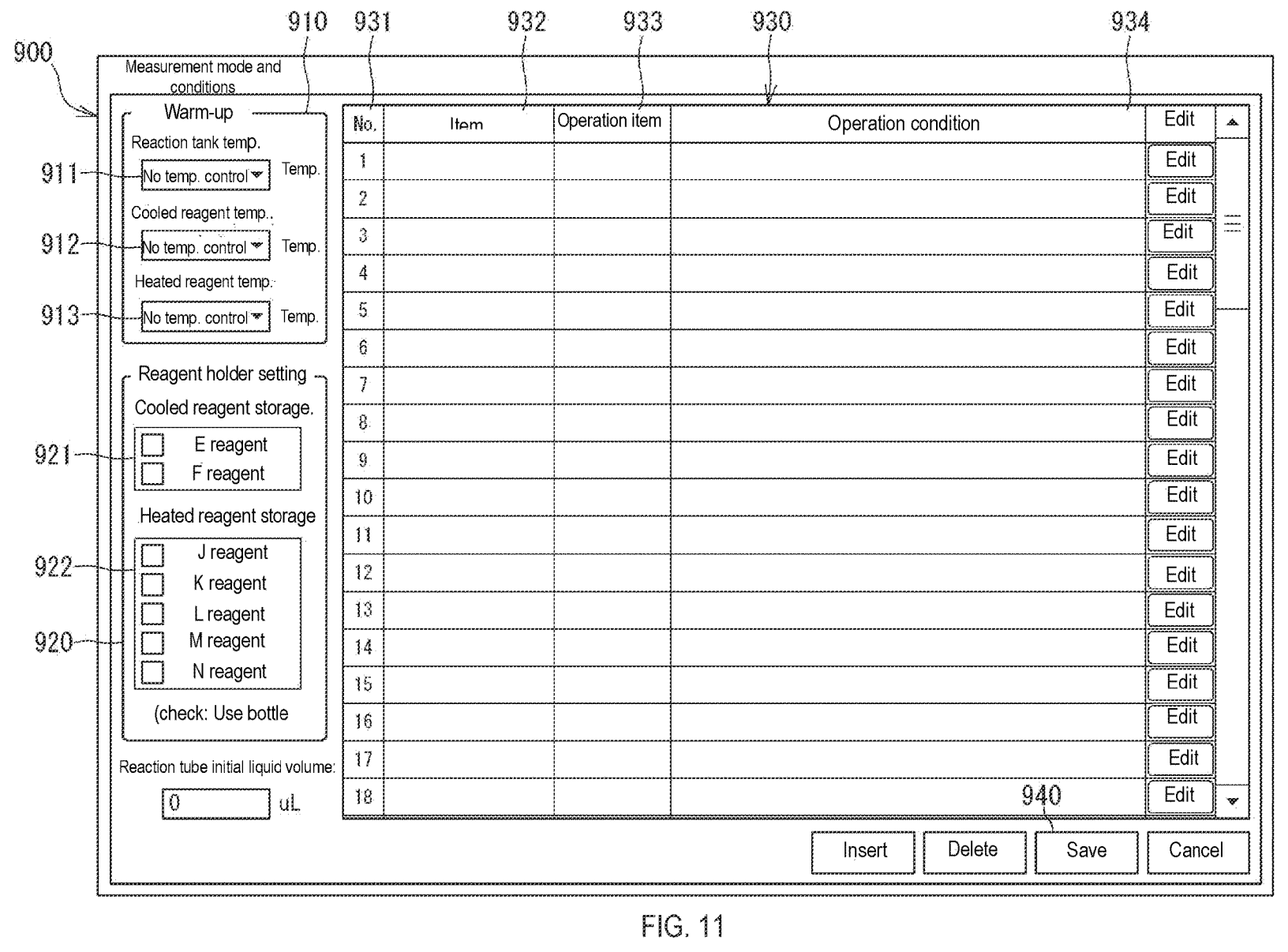

The setting screen 900 includes pretreatment operation items and operation condition setting areas 930. The setting area 930 has an area 931 indicating the order of the operation items. In FIG. 11, numbers are displayed in order from 1 in area 931. Numbers in the area 921 indicate the execution order of the operation items.

The setting area 930 has an area 932 for selecting operation items in each order indicated by the area 931. For example, when an area 932 corresponding to sequence "No. 1" is selected by the user, as shown in FIG. 12A, candidates of a plurality of action items in the sequence "No. 1" are displayed in the pull-down menu 940. The user selects one operation item from a plurality of operation items in the menu 940. "Temperature control" which is an operation item for temperature adjustment, "Dispensing" which is an operation item for dispensing reagent, "Mixing" which is an operation item for a sample, "Reaction" which is an operation item for reaction between a sample and a reagent, "Centrifugation" which is an operation item for centrifugal separation, "Supernatant" which is an operation item for removing supernatant and the like are included in the menu 940.

"Mixing A" in the menu 940 is an operation item for mixing performed outside the housing 400. When "mixing A" is selected, mixing is performed by the mixing part 274 of the external treatment part 270. "Mixing B" in the menu is an operation item for mixing performed in the housing 400. When "mixing B" is selected, mixing is performed in the housing 400 by suctioning and discharging the liquid by the nozzle 211. In this way it is possible to set whether mixing is performed in the housing 400 or outside the housing 400.

In the suction/discharge mixing performed in the housing 400, the liquid in the container 10 adheres to the pipette tip 212, and the liquid in the container 10 is depleted, albeit only slightly. Conversely, mixing by the mixing part 274 outside the housing 400 is shaking mixing, so that there is no contact between the liquid in the container 10 and the pipette tip, thus avoiding a decrease of the liquid in the container 10. Therefore, "mixing A" may be selected when the amount of the sample is small and when it is desired to avoid contact between the pipette tip and the liquid in the container 10 due to mixing.

"Supernatant removal (decant)" in the menu 940 is an operation item for removing the supernatant performed outside the housing 400. When "Supernatant removal (decant)" is selected, the supernatant is removed by decanting in the external treatment part 270. "Supernatant removal (pipette)" in the menu 904 is an operation item for removing the supernatant performed in the housing 400. When "Supernatant removal (pipette)" is selected, suction from the pipette tip attached to the nozzle 211 is performed to remove the supernatant in the housing 400. In this way it is possible to set whether supernatant removal is performed in the housing 400 or outside the housing 400. Removal of the supernatant by decanting is effective when it is desired to reduce the operation time or when it is not desired to consume a pipette tip. On the other hand, removal of the supernatant by suction from the pipette tip is effective when it is desired to reduce variations in the residual liquid amount or to remove trace liquid.

In the menu 940, a combination of a plurality of operation items such as "Dispensing A+mixing A" is also displayed. It is possible to easily select a plurality of operation items by selecting a combination of a plurality of operation items.

Figure 13:
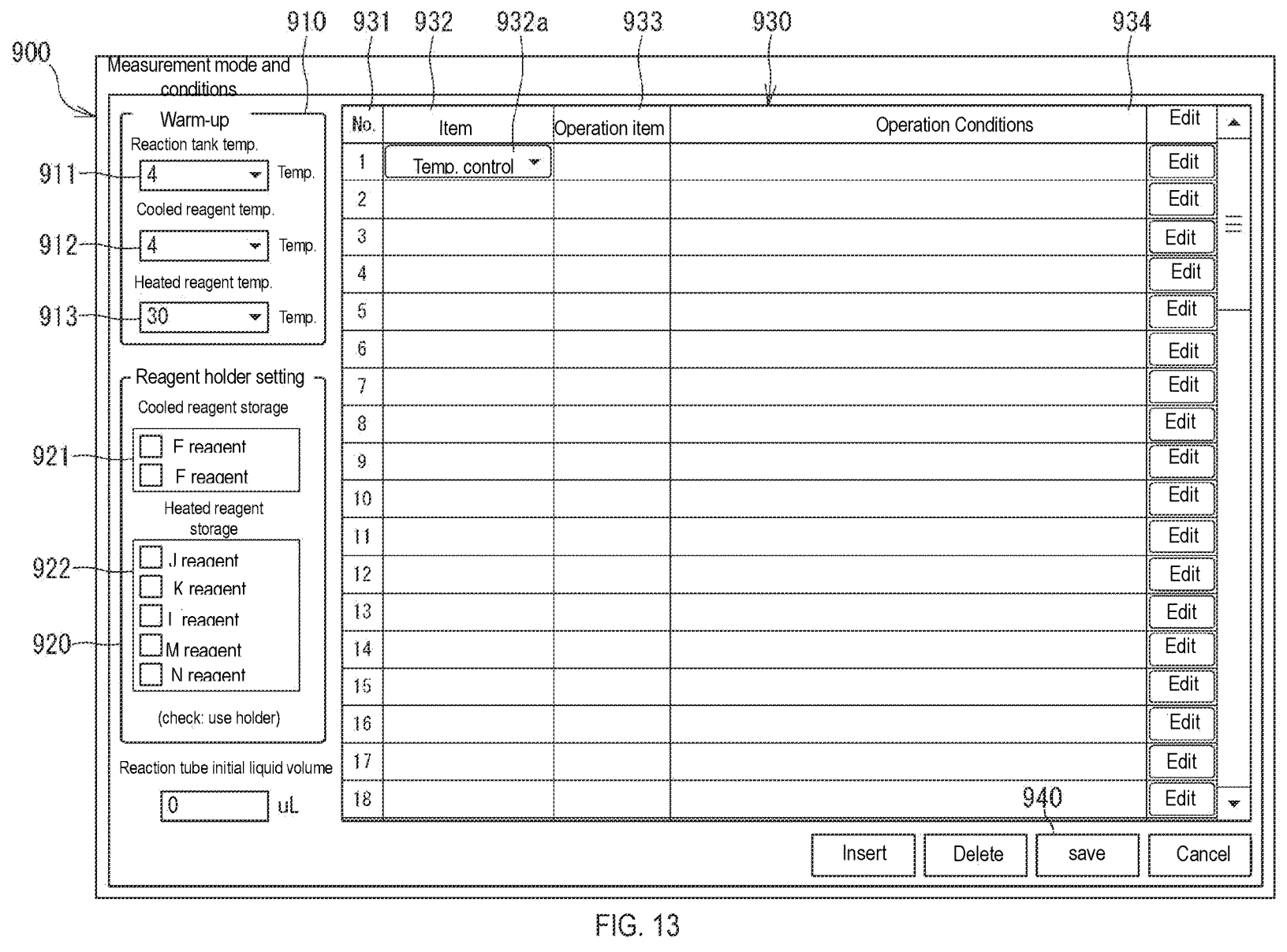

FIG. 13 shows the screen 900 when "Temperature control" is selected in the menu 940. In one processing mode, any number of "Temperature control" operation items can be set. For example, it is possible to set a first temperature suitable for the first reaction step in step S103-3 by setting "Temperature control" for executing the temperature changing step of step S101 in FIG. 7A, and it is possible to set a second temperature suitable for the second reaction step in step S119-3 by setting "Temperature control" for executing the temperature changing step in steps S111 and S118.

Figure 14A:
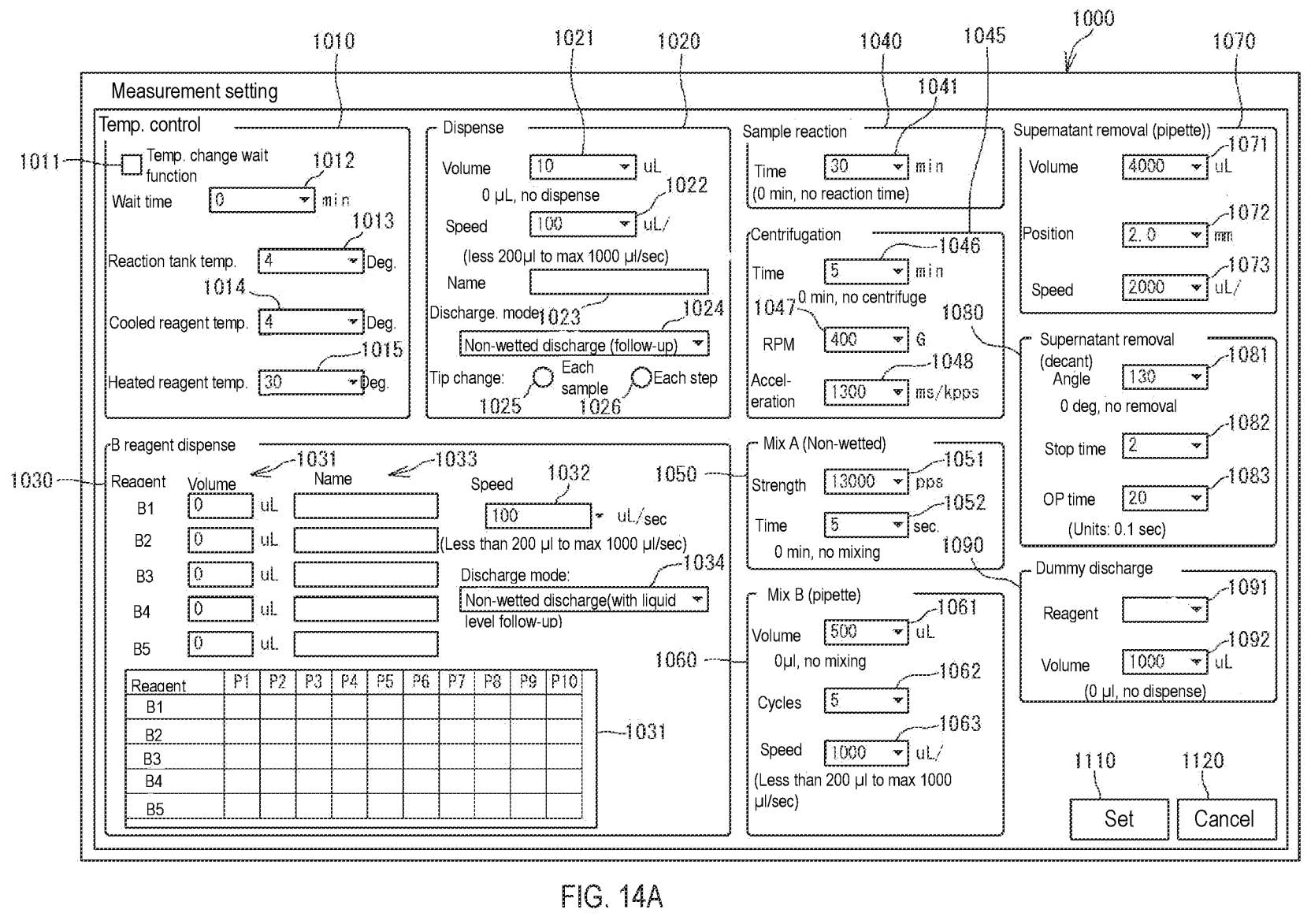

When the user selects the "Edit" button of the row for which "Temperature control" is selected on the screen 900 of FIG. 13, the controller 300 displays the operation condition setting screen 1000 shown in FIG. 14A on the display 310. In the screen 1000, it is possible to set operating conditions in the operation items selectable in the menu 940.

The screen 1000 includes a condition setting area 1010 for the operation item "Temperature control". In the region 1010, the temperature is set for after performing the temperature change step in which the operation item "Temperature control" is executed. The region 1010 includes a setting part 1013 for setting the temperature of the housing (reaction tank) 400, a setting part 1014 for setting the temperature of the first reagent installing part (cooled reagent storage) 220, and a setting part 1015 for setting the temperature of the second reagent installing part (heated reagent storage) 230. The designated temperatures set in the setting parts 1013, 1014, and 1015 are stored as designated temperature information 341a, 342a, and 343a in the storage 340. The temperature in the housing 400 can be changed in the temperature changing step since the setting part 1013 is provided. Since the setting parts 1014 and 1015 also are provided, the temperature in the reagent installing parts 220 and 230 can also be changed in the temperature changing process.

Figure 14B:
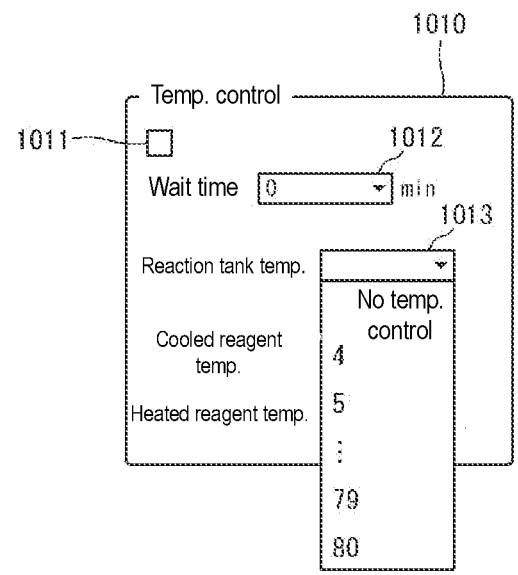
FIG. 14B is a diagram of an operation condition setting screen.
Figure 14C:
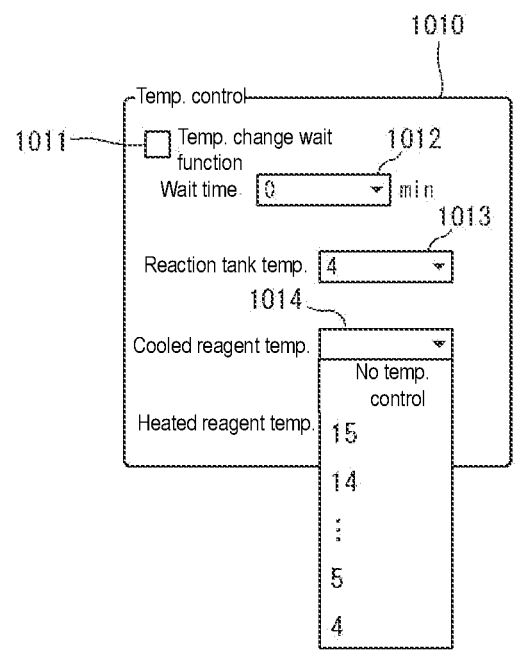
FIG. 14C is a diagram of an operation condition setting screen.
Figure 14D:
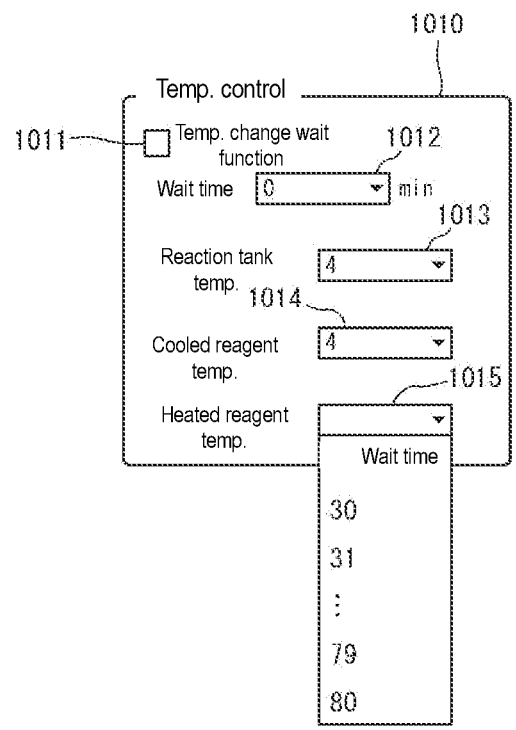
FIG. 14D is a diagram of an operation condition setting screen.
Figure 16:
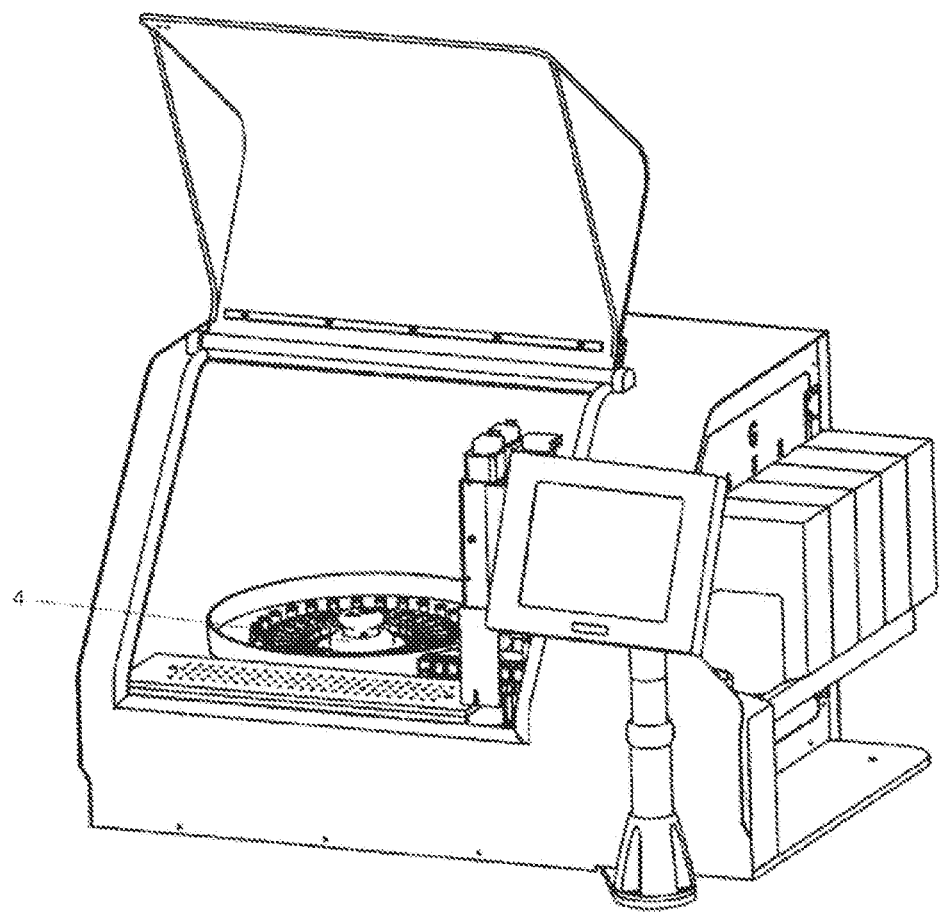
FIG. 16 is a diagram showing the apparatus described in Japanese Patent Application Publication No. 2015-508177.
Figure 17:
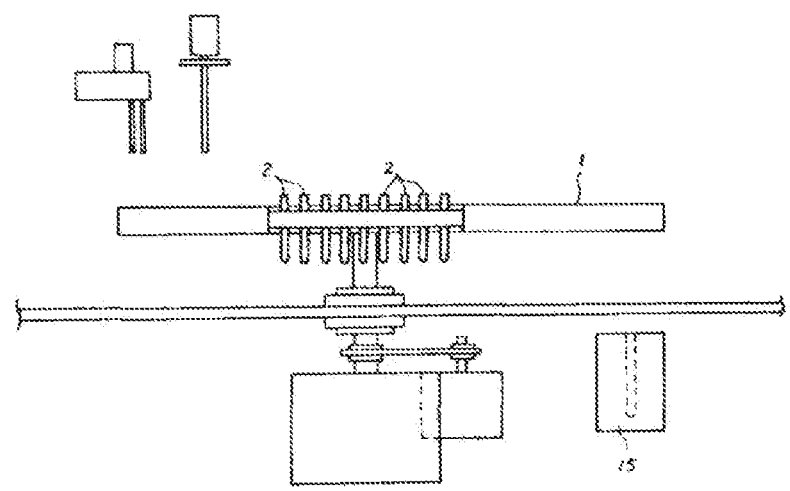
FIG. 17 is a diagram showing the apparatus described in Japanese Patent Application Publication No. 03-17536.
Figure 18:
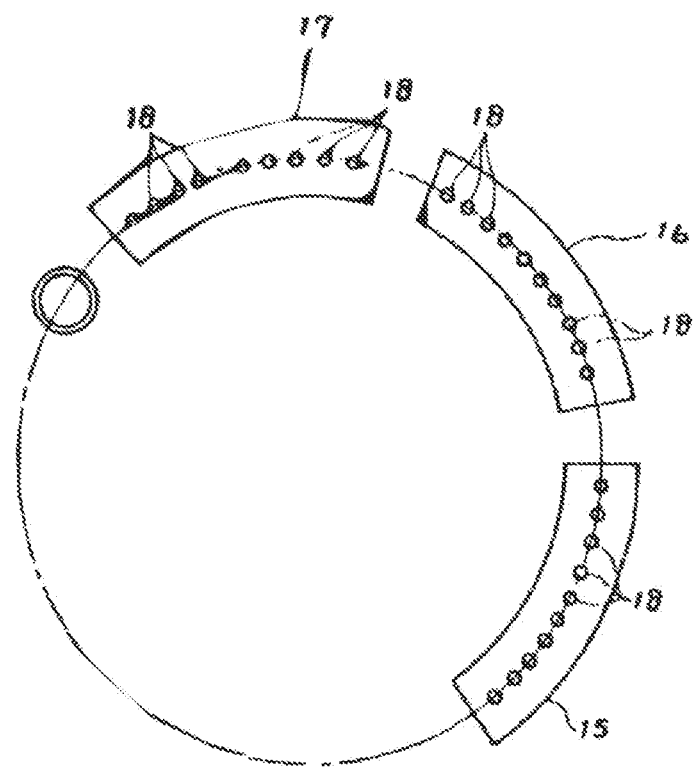
FIG. 18 is a diagram showing the apparatus described in Japanese Patent Application Publication No. 03-17536.

The setting parts 1013, 1014, and 1015 are pull-down menus, and when selected, a list of temperature candidates to be set is displayed as shown in FIG. 14B, FIG. 14C, and FIG. 14D. The list of temperature candidates includes not only temperature candidates but also "no temperature control" indicating that temperature adjustment is not performed. Temperature can be specified numerically in the temperature setting parts 1013, 1014, and 1015. Note that the designation of the temperature is not limited to the selection of the temperature candidates, and the input device 320 may directly accept a numerical value indicating a temperature.

Area 1010 includes ON/OFF selection part 1011 of a "Temperature change wait function". When the "Temperature change wait function" is ON, the process set to be performed following the temperature change step is not executed and the processing waits until the temperature in the housing 400 or the reagent installing parts 220 and 230 is switched to the set temperature. When the "Temperature change wait function" is OFF, the process set to be performed following the temperature changing step is executed before the temperature in the housing 400 or the reagent installing parts 220 and 230 is switched to the set temperature.

The area 1010 includes a wait time setting part 1012. In the setting part 1012, a waiting time set from setting the temperature set in the setting parts 1013, 1014, and 1015 to the next process. The setting of the waiting time is valid when the temperature change waiting function is set to ON. Since a waiting time is provided, the temperature of the liquid in the container 10 in the housing 400 or the temperature of the reagent in the reagent installing parts 220 and 230 can be brought close to the temperature set during the waiting time.

The screen 1000 includes a condition setting area 1020 for the operation item "Dispensing". In area 1020, dispensing conditions from dispensing A to dispensing N excluding dispensing B in menu 940 are set. The area 1020 includes a dispensing amount setting part 1021, a dispensing speed setting part 1022, a name setting part 1023 for the names of dispensing reagents, a discharge mode setting part 1024, and a selection parts 1025 and 1026 for setting whether to replace the pipette tip for each sample in each step.

In the embodiment, three discharge modes can be selected: non-wetted discharge (without liquid level follow-up), non-wetted discharge (with liquid level follow-up), and wetted discharge. Wetted discharge is a mode in which the pipette tip is brought into contact with the liquid in the container 10 and discharged. The non-wetted discharge is a mode in which the pipette tip is discharged above the liquid surface so as not to contact the liquid in the container 10. Liquid level follow-up is to move the pipette tip upward so as to follow the liquid level rise accompanying the discharge of the liquid.

The screen 1000 includes a condition setting area 1030 for the operation item "Dispensing B". In the area 1030, the dispensing condition is set for the reagent of the B1 to B5 reagent containers. The area 1030 includes a setting part 1031 for the amount of each reagent to be dispensed, a setting part 1032 for dispensing speed, a setting part 1033 for the name of reagent to be dispensed, a setting part 1034 for discharge mode, a setting part 1031 for the order in which each reagent will be dispensed.

The screen 1000 includes a condition setting area 1040 for an operation item "Reaction". The area 1040 includes a time setting part 1041 for reacting the dispensed reagent and the sample.

The screen 1000 includes a condition setting area 1045 for the operation item "centrifugation". In area 1045, conditions are set for centrifugal separation by the centrifugal separation device 600. The area 1045 includes a centrifugal separation time setting part 1046, a rotation number setting part 1047, and an acceleration setting part 1048.

The screen 1000 includes a condition setting area 1050 for the operation item "Mixing A". In area 1050, conditions are set for mixing outside the housing 400. Area 1050 includes a mixing intensity setting part 1051 and mixing time setting part 1052.

The screen 1000 includes a condition setting area 1060 for the operation item "Mixing B". In area 1060, conditions are set for mixing in the housing 400. Area 1060 includes a setting part 1061 for suction discharge amount in suction/discharge mixing, a setting part 1062 for suction/discharge count, and a setting part 1063 for suction/discharge speed.

The screen 1000 includes a condition setting area 1070 for the operation item "Supernatant removal (pipette)". In area 1070, conditions are set for removing the supernatant in the housing 400. The area 1070 includes a setting part 1071 for setting a suction amount in supernatant removal by suction, a setting part 1072 for setting a suction position (height), and a setting part 1073 for setting suction speed.

The screen 1000 includes a condition setting area 1080 for the operation item "Supernatant removal (decant)". In area 1080, condition are set for removing the supernatant outside the housing 400. The area 1080 includes a decant angle setting part 1081, a time setting part 1082 for tilting and stopping the container 10, and a decant operation time setting part 1083.

The screen 1000 includes a condition setting area 1090 for an operation item "Dummy discharge". In area 1090, conditions are set for performing a dummy discharge. The area 1090 includes a setting part 1091 for the type of reagent to be dummy discharged, and a setting part 1092 for dispensing amount of discharged reagent.

Conditions can be effectively activated for a setting because each area 1010, 1020, 1030, 1040, 1045, 1050, 1060, 1070, 1080, and 1090 of the screen 1000 are only areas corresponding to the operation item selected in the operation item selection area 932. For example, as shown in FIG. 13, only the area 1010 is activated on the screen 1000 for the operation item "Temperature control", and only the condition for temperature control can be set. When a combination of a plurality of operation items is selected in the operation item selection area 932, setting is enabled in the area corresponding to a plurality of operation items on the screen 1000.

When the setting button 1110 of the screen 1000 is selected, the operation condition regarding the operation item is saved and the display returns to screen 900. When cancel 1120 is selected, the operation condition is not saved and the display returns to screen 900.

Figure 15:
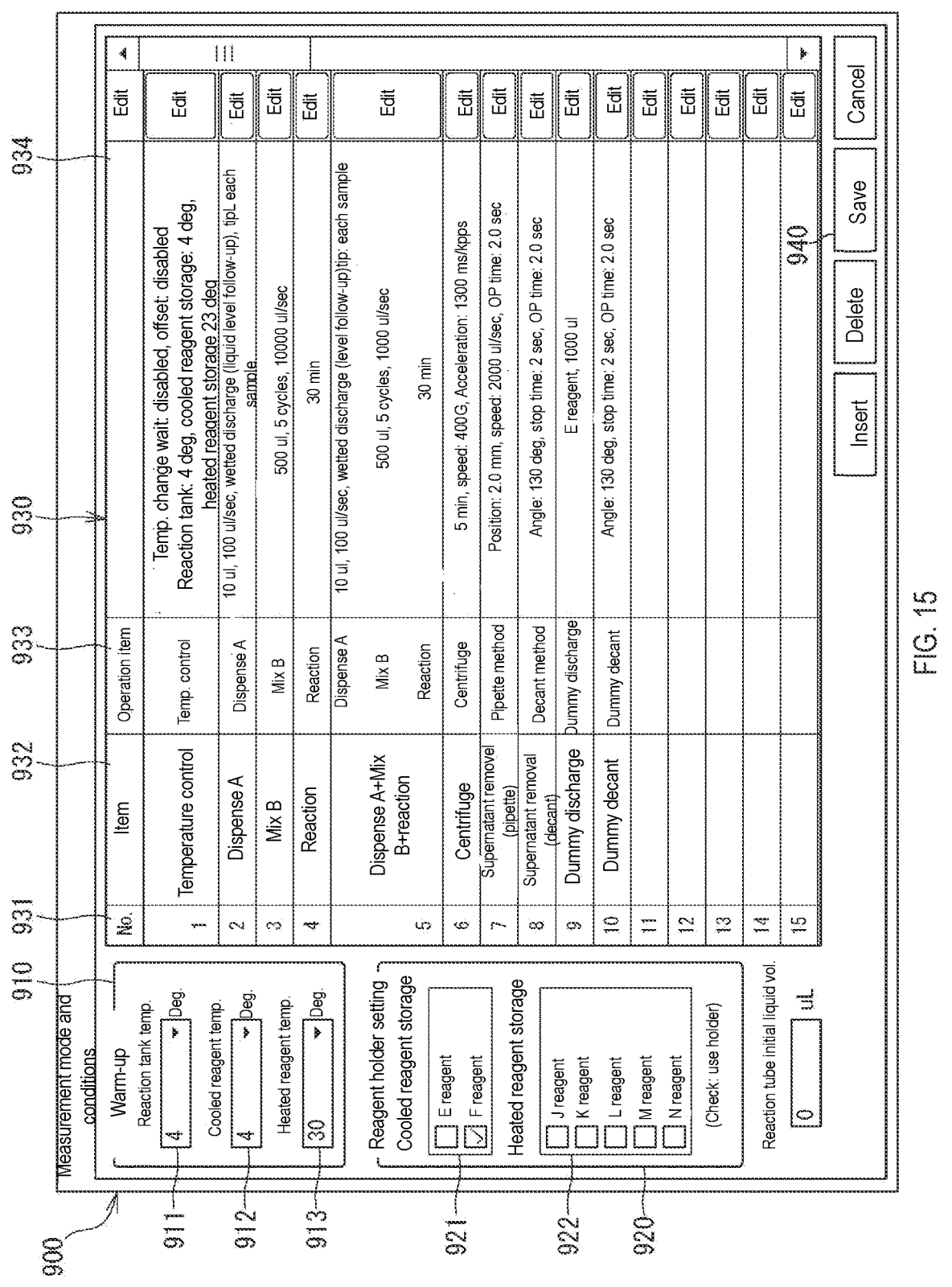

FIG. 15 shows an example of the screen 900 after setting operation items in each order. The setting area 930 includes an operation item display 933 indicating the set operation item, and an operation condition display 934 indicating the set operation condition. In the operation condition display 934, the conditions set on the screen 1000 of FIG. 14A are displayed for the operation items in each order. When the save button 940 is selected on the screen 900 of FIG. 15, the processing mode set on screen 900 is saved as the setting file 341. The saved file 341 can be selected to select the processing mode on screen 800 of FIG. 5A and FIG. 5B.

In the present embodiment, the user can freely set appropriate pretreatment conditions since conditions of pretreatment corresponding to analysis items can be set on the setting screens 900 and 1000.

What is claimed is:

1. A pretreatment apparatus for performing pretreatment of a sample containing cells, the apparatus comprising:
  a centrifugal separation device having a holder that holds a container containing the sample and configured to centrifuge the sample by rotating the container in the holder;
  a sample temperature adjustment device configured to adjust a temperature of the sample in the container in the holder;
  first and second reagent storages respectively configured to hold a first reagent container accommodating a first reagent containing a substance to label the cells in the sample and a second reagent container accommodating a second reagent different from the first reagent;
  a reagent temperature adjustment device configured to adjust temperatures of the first and second reagents in the first and second reagent storages;
  a dispenser configured to dispense the first reagent and the second reagent into the sample in the container in the holder;

a display configured to show a selection screen for selecting one of a plurality of modes corresponding to analysis items;

an input device configured to receive a selection of a mode on the selection screen;

a controller storing a temperature setting for each of the plurality of modes and configured to control the sample temperature adjustment device and the reagent temperature adjustment device according to the temperature setting in response to the mode selection, wherein the temperatures of the first and second reagents in the first and second reagent storages are controlled at different temperatures.

2. The pretreatment apparatus according to claim 1 further comprising:

a housing for internally housing the centrifugal separation device;

wherein the sample temperature adjustment device and the reagent temperature adjustment device are provided within the housing.

3. The pretreatment apparatus according to claim 1, wherein the selection screen is configured to receive designation of a numerical value indicating a temperature.

4. The pretreatment apparatus according to claim 1, wherein the selection screen is configured to receive setting of contents of a plurality of operations included in the pretreatment and a plurality of sample temperatures for the plurality of operations.

5. The pretreatment apparatus according to claim 4, wherein the selection screen is configured to receive setting of whether to perform an operation included in the pretreatment while switching from a first sample temperature included in the plurality of sample temperatures to a second sample temperature included in the plurality of sample temperatures.

6. The pretreatment apparatus according to claim 1, wherein the selection screen is configured to receive setting of the temperatures of the first reagent and the second reagent.

7. The pretreatment apparatus according to claim 1, wherein the controller includes a storage that stores information indicating the sample temperature setting for each of the plurality of modes.

8. The pretreatment apparatus of claim 1, further comprising:

a first reagent installing part in which the first reagent is installed;

a second reagent installing part in which the second reagent is installed;

wherein the reagent temperature adjustment device adjusts the reagent temperatures in the first reagent installing part and the second reagent installing part;

wherein the input device receives reagent temperature information indicating the temperatures of the first and second reagent installing parts from a user; and wherein the controller controls the reagent temperature adjustment device according to the temperatures indicated by the reagent temperature information.

9. The pretreatment apparatus according to claim 1, wherein the pretreatment further comprises fixing and permeabilizing cells contained in the sample.

10. The pretreatment apparatus according to claim 1, further comprising:

a housing for internally housing the centrifugal separation device;

wherein the sample temperature adjustment device adjusts an ambient temperature in the housing;

the controller controls a first reaction of the sample and the first reagent in the container within the housing, a centrifugal separation of removing unreacted components in the first reaction, and a second reaction of the sample and the second reagent, and controls a switching of an ambient temperature in the housing by the sample temperature adjustment device such that the first reaction and the second reaction are performed at different temperatures.

11. The pretreatment apparatus according to claim 10, wherein the controller executes at least one other operation included in the pretreatment while the ambient temperature in the housing is being switched.

12. The pretreatment apparatus according to claim 10, wherein the controller performs controls to start the second reaction after the ambient temperature in the housing is switched.

13. A pretreatment apparatus comprising:

a pretreatment device including a holder that holds a container containing a sample containing cells and configured to perform pretreatment of the sample, the pretreatment including a reaction of the sample and at least a first reagent in the container in the holder;

a sample temperature adjustment device configured to adjust a temperature of the sample in the container in the holder;

a first reagent installing part in which the first reagent is installed;

a first reagent temperature adjustment device configured to adjust a temperature of the first reagent installed in the first reagent installing part;

a second reagent installing part in which a second reagent is installed, wherein the second reagent is different from the first reagent;

a second reagent temperature adjustment device configured to adjust a temperature of the second reagent installed in the second reagent installing part;

an input device configured to receive, from a user, a designated temperature of the sample that is adjusted by the sample temperature adjustment device, a designated temperature of the first reagent that is adjusted by the first reagent temperature adjustment device, and a designated temperature of the second reagent that is adjusted by the second reagent temperature adjustment device;

a controller configured to control the sample temperature adjustment device, the first reagent temperature adjustment device, and the second reagent temperature adjustment device according to the designated temperatures received through the input device, wherein the temperature of the first reagent temperature adjustment device and the second reagent temperature adjustment device are controlled at different temperatures, and a display that shows a setting screen for designating a temperature, wherein the input device is further configured to receive a designation of a temperature of the sample that is adjusted by the sample temperature adjustment device from a user for each of a plurality of modes corresponding to analysis items;

wherein the display is further configured to show a selection screen for selecting one of the plurality of modes corresponding to the analysis items; and wherein the controller is further configured to control the sample temperature adjustment device according to the temperature of the sample designated in the mode selected on the selection screen.

14. A pretreatment apparatus comprising:

a pretreatment device configured to perform pretreatment of a sample, the pretreatment including a reaction of a sample and at least a first reagent;

a sample temperature adjustment device that adjusts a temperature of the sample to be processed by the pretreatment device;

a reagent temperature adjustment device configured to adjust a temperature of the first reagent stored in the pretreatment apparatus and a temperature of a second reagent stored in the pretreatment apparatus, wherein the second reagent is different from the first reagent;

an input device configured to receive, from a user, setting of an operation mode of a plurality of operation modes, each one of the plurality of operation modes including contents of a plurality of operations of the pretreatment device, a sample temperature that is adjusted by the sample temperature adjustment device, a first reagent temperature that is adjusted by the reagent temperature adjustment device, and a second reagent temperature that is adjusted by the reagent temperature adjustment device when performing each operation;

a display that shows a selection screen for selecting one of the plurality of operation modes; and a controller storing a sample temperature setting, a first reagent temperature setting, and a second reagent temperature setting for each of the operation modes and configured to control the pretreatment device, the sample temperature adjustment device, and the reagent temperature adjustment device according to the selected operation mode of the plurality of operation modes set through the input device, wherein the controller is further configured to control the reagent temperature adjustment device such that the temperature of the first reagent is different from the temperature of the second reagent.

15. A pretreatment method comprising:

displaying a selection screen for selecting one of a plurality of modes;

receiving a selection of a selected one of the plurality of modes;

adjusting a sample temperature inside a container held in a centrifugal separation device according to a sample temperature predesignated for the selected one of the plurality of modes;

adjusting a first reagent temperature inside a first reagent storage according to a first reagent temperature predesignated for the selected one of the plurality of modes;

adjusting a second reagent temperature inside a second reagent storage according to a second reagent temperature predesignated for the selected one of the plurality of modes, wherein the second reagent is different from the first reagent and wherein the second reagent temperature is different from the first reagent temperature; and performing a centrifugal separation by rotating the sample temperature-adjusted container.

16. A pretreatment method comprising:

receiving a designated temperature of a sample for each of a plurality of modes;

receiving a designated temperature of a first reagent;

receiving a designated temperature of a second reagent that is different from the designated temperature of the first reagent, wherein the second reagent is different from the first reagent;

receiving a selection of a selected one of the plurality of modes;

adjusting a temperature of the sample according to the selected one of the plurality of modes;

adjusting a temperature of the first reagent according to the received designated temperature of the first reagent;

adjusting a temperature of the second reagent according to the received designated temperature of the second reagent;

carrying out a reaction of the temperature-adjusted sample and at least one of the temperature-adjusted first reagent or the temperature-adjusted second reagent.

17. A pretreatment method comprising:

displaying a setting screen for setting an operation mode of a plurality of operation modes of a pretreatment apparatus to perform pretreatment of a sample;

receiving, in the setting screen from a user, a setting of each one of the plurality of operation modes including contents of a plurality of operations of the pretreatment apparatus, a sample temperature when performing each operation for each of the plurality of operation modes, a first reagent temperature at which to store a first reagent, and a second reagent temperature at which to store a second reagent, wherein the second reagent is different from the first reagent and wherein the second reagent temperature is different from the first reagent temperature;

receiving a selection of a selected one of the plurality of operation modes; and controlling a pretreatment operation of the pretreatment apparatus according to the selected one of the plurality of operation modes, including controlling the sample temperature, the first reagent temperature, and the second reagent temperature, wherein the first reagent temperature and the second reagent temperature are controlled to be different from each other.

18. A pretreatment apparatus comprising:

a pretreatment device configured to perform a pretreatment process of a sample, the pretreatment process including a sequence of steps;

a sample temperature adjustment device that adjusts a sample temperature of the sample to be processed by the pretreatment device;

a reagent temperature adjustment device configured to adjust a first reagent temperature of a first reagent stored in a first reagent storage and a second reagent temperature of a second reagent stored in a second reagent storage, wherein the second reagent is different from the first reagent;

a display that shows a setting screen for designating the sample temperature, the first reagent temperature, and the second reagent temperature for at least one of the steps in the sequence of steps, wherein the first reagent temperature is different from the second reagent temperature; and a controller configured to control the pretreatment device, the sample temperature adjustment device, and the reagent temperature adjustment device so that a pretreatment process of a sample is performed at an adjusted sample temperature along the sequence of steps, wherein the controller is further configured to control the sample temperature adjustment device to adjust the sample temperature to the designated sample temperature in response to the pretreatment process proceeding to a specific step, wherein controller is further configured to control the first reagent temperature of the first reagent to be different from the second reagent temperature of the second reagent.

\* \* \* \* \*